(12) United States Patent
Araújo et al.

(10) Patent No.: US 11,159,509 B2
(45) Date of Patent: Oct. 26, 2021

(54) METHOD AND COMMUNICATION DEVICES FOR EXTENDING LOG-IN TO MULTIPLE COMMUNICATION DEVICES

(71) Applicant: Telefonaktiebolaget LM Ericsson (publ), Stockholm (SE)

(72) Inventors: José Araújo, Stockholm (SE); Lars Andersson, Solna (SE); Guoqiang Zhang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 686 days.

(21) Appl. No.: 16/063,945

(22) PCT Filed: Dec. 21, 2015

(86) PCT No.: PCT/SE2015/051384
§ 371 (c)(1),
(2) Date: Jun. 19, 2018

(87) PCT Pub. No.: WO2017/111672
PCT Pub. Date: Jun. 29, 2017

(65) Prior Publication Data
US 2020/0274865 A1 Aug. 27, 2020

(51) Int. Cl.
*G06F 11/00* (2006.01)
*G06F 12/14* (2006.01)
(Continued)

(52) U.S. Cl.
CPC .......... *H04L 63/0815* (2013.01); *G06F 21/41* (2013.01); *H04L 63/083* (2013.01); *H04L 63/0861* (2013.01); *H04W 12/06* (2013.01)

(58) Field of Classification Search
CPC .............................. G06F 21/41; H04W 12/06
(Continued)

(56) References Cited

U.S. PATENT DOCUMENTS

| 2013/0138388 A1 | 5/2013 | Jain et al. |
| 2015/0181430 A1* | 6/2015 | Lee ........................ H04L 9/3231 726/5 |
| 2015/0278498 A1* | 10/2015 | Hong ..................... G06F 21/32 340/5.82 |

OTHER PUBLICATIONS

International Search Report and Written Opinion dated Sep. 2, 2016 for International Application No. PCT/SE2015/051384 filed Dec. 21, 2015, consisting of 8-pages.
(Continued)

*Primary Examiner* — Jeffrey C Pwu
*Assistant Examiner* — Samuel Ambaye
(74) *Attorney, Agent, or Firm* — Christopher & Weisberg, P.A.

(57) ABSTRACT

A method at a primary communication device for participating in log-in of a secondary communication device where, upon recognizing a successful log-in of the primary communication device, a request for extended log-in to the secondary communication device is received from the secondary communication device. Instruction to initiate the requested extended log-in is transmitted to the secondary communication device. After having received physiological data, associated with the user of the secondary communication device, the first physiological data is compared with the physiological data provided from the secondary device for determining whether there is a match between the compared physiological data. In case of a match at least one credential is transmitted to the secondary communication device, whereas no credential is transmitted to the secondary device if no match is determined.

20 Claims, 14 Drawing Sheets

(51) Int. Cl.
 G06F 12/16 (2006.01)
 G08B 23/00 (2006.01)
 H04L 29/06 (2006.01)
 G06F 21/41 (2013.01)
 H04W 12/06 (2021.01)

(58) Field of Classification Search
 USPC .................................................. 726/5, 25
 See application file for complete search history.

(56) References Cited

OTHER PUBLICATIONS

Fleishman, Glenn; Title: Wearable security: Authentication apps for Apple Watch; https://www.macworld.com/article/2929014/wearable-security-two-facto . . . ; Jun. 1, 2015, consisting of 4-pages.

Li, et al.; Title: Body Area Network and Its Standardization at IEEE 802.15.MBAN; Published in 2007 16th IST Mobile and Wireless Communications Summit; Conference Location and Date: Budapest, Hungary, Jul. 1-5, 2007, consisting of 5-pages.

European Examination Report dated Nov. 26, 2019 issued in corresponding European Patent Application No. 19188835.3, consisting of 5 pages.

* cited by examiner

METHOD AND COMMUNICATION DEVICES FOR EXTENDING LOG-IN TO MULTIPLE COMMUNICATION DEVICES

CROSS-REFERENCE TO RELATED APPLICATIONS

This application is a Submission Under 35 U.S.C. § 371 for U.S. National Stage Patent Application of International Application Number: PCT/SE2015/051384, filed Dec. 21, 2015 entitled "METHOD AND COMMUNICATION DEVICES FOR EXTENDING LOG-IN TO MULTIPLE COMMUNICATION DEVICES," the entirety of which is incorporated herein by reference.

TECHNICAL FIELD

The present disclosure relates to a method for enabling extending log-in from a first communication device to one or more, further communication devices, and communication devices capable of executing the suggested method.

BACKGROUND

In recent years, the market of electronic devices has increased dramatically. Gartner predicted in 2014 that there will be 25 billion connected things by 2020 (excluding smartphones) while Cisco predicts that there will be 24 billion connected devices by 2019, of which 47% are cellular connected (including smartphones). Among these devices are smartphones, tablets, head-mounted displays, smartwatches and other wearables, such as e.g. smart clothes.

The devices referred to above are to be operated in a secure manner, where authentication/log-in is needed in order for an individual to access the device. In smartphones, tablets and smartwatches, this is currently done based on the insertion of a password, or based on biometric data, such as e.g. fingerprints or eye analysis. In the future, it is expected that head-mounted displays as well as other wearables or connected devices will also provide a safe authentication/ login of the user. Moreover, the authentication/login is expected to be performed in a quick and robust manner. With the large quantity of devices to be worn by the user, authentication/login on each device may become tedious and frustrating to the user. One can imagine the case where a user possesses a smartwatch, smartphone and a head-mounted display. If the user is currently using one of the devices and then wants to start using another one, it is rather cumbersome if the user is prompted with the login screen in each of the devices and must authenticate himself/herself every time he/she wants to use the device.

SUMMARY

It is an object of the present document to address, the problem of how to avoid repeated log-in procedures at additional communication device, if a log-in of a first communication device has already been successfully completed.

According to one aspect a method at a primary communication device, capable of communicating with a secondary communication device, is provided. The method is initiated by recognizing a successful log-in of the primary communication device, after which it is determined that the secondary communication device require log-in of the primary communication device to be extended to the secondary communication device. Next, the primary communication device is receiving physiological data associated with the user of the secondary communication device, and captured by at least one sensor of the secondary communication device, via the body of the mentioned user, from the secondary communication device. The primary communication device is capturing physiological data sensed by at least one sensor of the primary communication device via the body of the mentioned user, and, once the primary communication device have access to physiological data acquired both by the primary and secondary communication device, the primary communication device is comparing the acquired physiological data and for determining whether there is a match between the compared physiological data. In case there is a match between the compared physiological data, at least one credential, required by the secondary communication device for extending the mentioned log-in to the secondary communication device, is transmitted to the secondary communication device whereas no credential is transmitted to the secondary device in case no match is determined.

According to another aspect, a computer program is suggested, where the computer program comprise computer program code which when executed by at least one processor of the primary communication device causes the primary communication device to perform the method disclosed above.

According to yet another aspect, a computer program product comprising a computer program as suggested above, and computer readable means on which the computer program is stored, is also suggested.

According to yet another aspect, a method at a secondary communication device, capable of communicating with a primary communication device for performing a log-in of the secondary communication device, is suggested. The suggested method comprise recognizing that the secondary communication device is worn or handheld, by capturing data, via at least one sensor, indicating that the secondary communication device is in contact with a human body. The method also comprises determining that the secondary communication device require log-in of the primary communication device to be extended to the secondary communication device, and transmitting a request for extending log-in of the primary communication device to the secondary communication device, to a primary communication device. The method also comprise capturing physiological data, sensed by at least one sensor via the body of the user of the secondary communication device and transmitting the captured physiological data to the primary communication device. In case of a match between the physiological data captured by the primary and the secondary communication device, at least one credential is received from the primary communication device, and the secondary device will then be able to execute the mentioned extended log-in of the secondary communication device, based on the at least one received credential.

The method described above will allow one or more secondary communication devices to make use of a simplified log-in procedure, where no log-in credentials need to be provided to any secondary communication device, once they have been provided to a primary communication device in a successful log-in procedure, logging in to the same service or platform.

According to yet another aspect a computer program is suggested, where the computer program comprise computer program code which when executed by at least one processor of the primary communication device causes the primary communication device to perform the method disclosed above.

According to yet another aspect, a computer program product comprising a computer program as suggested above, and computer readable means on which the computer program is stored, is also suggested.

According to another aspect, a primary communication device comprising a processor, a communication interface, and a memory is suggested, where the memory comprise computer readable code, which when executed by the processor causes the primary communication device to: recognize a successful log-in of the primary communication device; determine that the secondary communication device require the log-in of the primary communication device to be extended to the secondary communication device; receive, physiological data associated with the user of the secondary communication device and captured by at least one sensor of the secondary communication device, via the body of the mentioned use, from the secondary communication device, via the communication interface; capture physiological data sensed by at least one sensor of the primary communication device via the body of the mentioned user; compare the acquired physiological data and determining whether there is a match between the compared physiological data, and transmit, at least one credential, required by the secondary communication device for extending the mentioned log-in to the secondary communication device, to the secondary communication device, via the communication interface, in case there is a match between the compared physiological data, whereas no credential is transmitted to the secondary device in case no match is determined.

According to another aspect, a primary communication device is suggested comprising: a log-in module for recognizing a successful log-in of the primary communication device; a determining module for determining that the secondary communication device require the log-in of the primary communication device to be extended to the secondary communication device, a second receiving module for receiving, from the secondary communication device, physiological data associated with the user of the secondary communication device, and captured by at least one sensor of the secondary communication device, via the body of the mentioned user; a capturing for capturing physiological data sensed by at least one sensor of the primary communication device via the body of the mentioned user; a comparing module for comparing the acquired physiological data and determining whether there is a match between the compared physiological data, and a second transmitting module for transmitting, to the secondary communication device, at least one credential, required by the secondary communication device for extending the mentioned log-in to the secondary communication device, in case there is a match between the compared physiological data, whereas no credential is transmitted to the secondary device in case no match is determined.

According to yet another embodiment, a secondary communication device comprising a processor, a communication interface, and a memory, comprising computer readable code, is suggested. When executed by the processor the code causes the secondary communication device to: recognize that the secondary communication device is worn or handheld, by capturing data via at least one sensor, indicating that the secondary communication device is in contact with a human body; determine that the secondary communication device require log-in of the primary communication device to be extended to the secondary communication device; transmit, a request for extending log-in of the primary communication device to the secondary communication device, to a primary communication device, via the mentioned communication interface; capture physiological data sensed by at least one second type sensor via the body of the user of the secondary communication device; transmit the captured physiological data to the primary communication device, via the mentioned communication interface; receive, at least one credential, from the primary communication device, via the mentioned communication interface, thereby verifying that the physiological data captured by the secondary device match with the physiological data captured by the primary communication device, and execute the mentioned extended log-in of the secondary communication device based on the at least one received credential.

According to another aspect, a secondary communication device is suggested, which comprise: a sensing module for recognizing that the secondary communication device is worn or handheld, by capturing data via at least one sensor, indicating that the secondary communication device is in contact with a human body; a determining module for determining that the secondary communication device require log-in of the primary communication device to be extended to the secondary communication device; a first transmitting module for transmitting a request for extending log-in of the primary communication device to the secondary communication device, to a primary communication device; a capturing module for capturing physiological data sensed by at least one second type sensor via the body of the user of the secondary communication device, a second transmitting module for transmitting the captured physiological data to the primary communication device; a first receiving module for receiving, at least one credential, from the primary communication device, verifying that the physiological data captured by the secondary device match with the physiological data captured by the primary communication device, and a log-in module for executing the mentioned extended log-in of the secondary communication device, based on the at least one received credential.

BRIEF DESCRIPTION OF DRAWINGS

Embodiments will now be described in more detail in relation to the accompanying drawings, in which.

DETAILED DESCRIPTION

Figure 1:
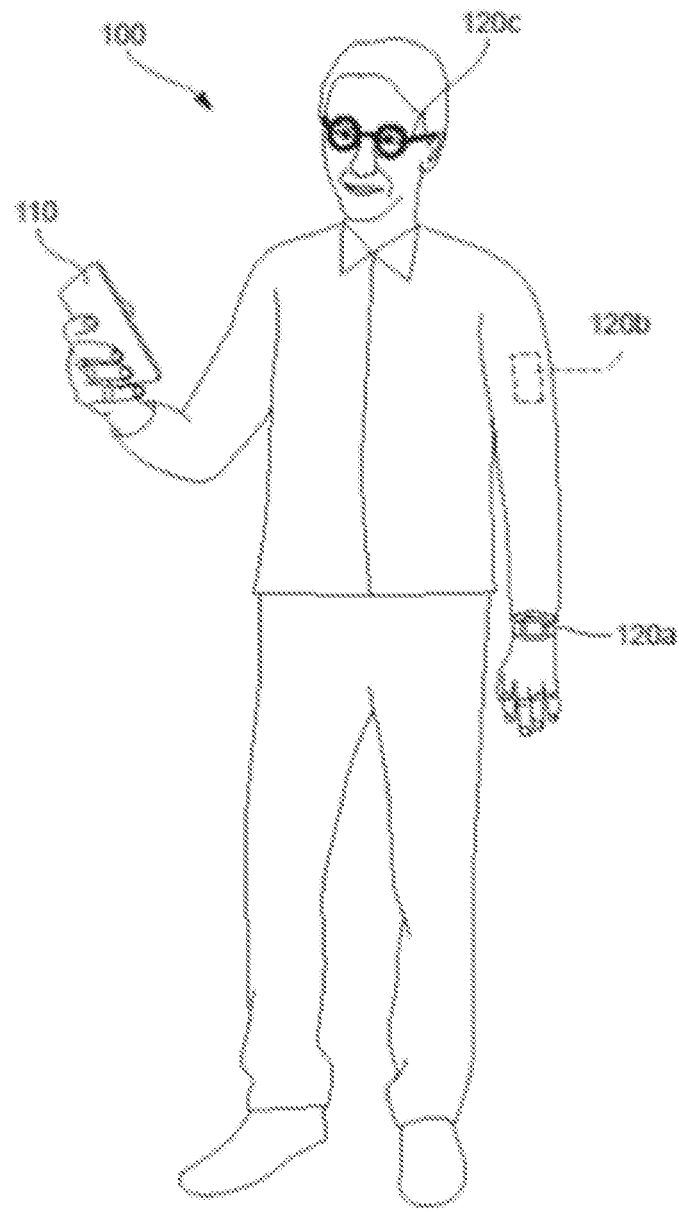
FIG. 1 is an overview of a system comprising communication devices capable of participating in an extended log-in procedure.

Briefly described, a method is suggested where it is possible for a user who has logged-in a first communication device, such as e.g. a smart phone, a pad, a wearable, or any other type of communication device in which a user is capable of inserting log-in credentials, to a service or platform, to initiate logging-in of further communication devices to the same service or platform, provided that the further communication devices are found to be handheld or worn by the user, and as long as physiological data captured from the body of the user by the first communication device is found to match with physiological data captured by the further communication device worn or hold by the user. Physiological data is typically captured by measuring the respective data by applying one or more sensors adapted therefore.

The log-in of the additional communication device mentioned above is here referred to as an extended log-in procedure. More specifically, the extended log-in procedure implies that further communication devices can log-in to the same service or platform as an already logged-in device, without requiring any active entering of the log-in credentials by the user for the further communication device. Instead the required log-in credentials are provided from the already logged-in communication device to the further communication device, thereby enabling the further communication device to use these credentials in an extended log-in procedure. In the present context, the further communication device uses the acquired log-in credentials for automatically executing a log-in procedure by way of applying wireless access to the respective service/platform. Different ways of executing a log-in procedure wirelessly is known in the art, and, thus, the wireless log-in procedure as such will not be covered herein.

Currently wearables and other devices carried by the user often are provided with heterogeneous sensors, and more sensors are expected to be added to wearables and other devices in the near future, in order to capture information about the user. Some sensors are able to measure the heart signal (EKG), muscle movement (EMG), motion (accelerometers, gyroscopes, etc.), skin salt concentration, skin smell, human microbes, the bodies magnetic field, temperature, which in this document will be referred to as physiological data. Some of the measured signals which can be captured by the above mentioned sensors in various parts of the human body, such as e.g. heart signal, smell, skin salt concentration, correlate globally, while others, such as e.g. single body part motion, muscle movement, temperature, may only correlate locally.

The suggested method rely on sensors for determining that a log-in executed on a first communication device can be extended to a further communication device, where the latter device is either handheld or worn by the user who has already logged-in the first communication device. More specifically, sensors, typically capacitive sensors, are used for determining that the further communication device is worn or handheld by a human, by determining that the further communication device is in contact with or in close vicinity of the human body of the mentioned user. Close vicinity is here to be construed as being in physical contact with the human body or being arranged so that it is substantially in contact with the human body, but where e.g. the fabric of a shirt, is arranged between a communication device comprised in a smart shirt and the human body. The accepted tolerance in the respect of deciding close vicinity will be determined by the capability of the applied sensors, so that in case the respective one or more sensors is capable of sensing the presence of a human body e.g. when a piece of fabric in located between the sensor and the human body, a communication device will be able to determine that the respective communication device is indeed held or worn by a user. In this respect, textiles may e.g. be able to relay signals from a human body, thereby allowing sensing also when no direct contact is established between the human body and the one or more sensors. Examples of different types of smart textiles are mentioned e.g. in "Smart Textiles and Wearable technology—A study of smart textiles in fashion and clothing" Lena Berglin, The Swedish school of textiles, available via: https://www.hb.se/Global/THS/BalticFashion rapport Smarttextiles.pdf.

Once it has been determined that the further communication device is worn or handheld by the user and an extended log-in procedure has been initiated, sensors, capable of capturing physiological data, will be used both by the first communication device and the further communication device, thereby enabling both devices to capture corresponding physiological data, typically by measuring certain data via one or more sensors adapted therefore. The first communication device then compares the physiological data from both communication devices and in case there is a match between the physiological data, i.e. the physiological data is, with satisfying probability, considered to origin from the same body, and an extended log-in can commence. By physiological data we hereby mean any type of data reflecting any type of physiological status of a specific user, who has logged in to a primary device and is capable of communicating with one or more secondary devices, held or worn by the same user. Sensors applicable for the described use are e.g. mentioned in "Electronics & Computers Capacitance Sensing in Human Body Contact Applications", Wayne Palmer, Sensors online, Jul. 1, 2010, available at: http://www.sensorsmag.com/electronics-computers/capacitance-sensing-human-body-contact-applications-7295

FIG. 1 is an illustration of a system, capable of operating as suggested above, where a user 100 is holding a communication device 110, which may be e.g. a smart phone, a pad, or any other communication enabled device on which he is capable of logging-in to a specific service or platform, by using some type of authentication credentials, typically a password. The user 100 also wears a plurality of further communication devices 120a, 120b, 120c, some or all of which may also be referred to as wearables. In this document, the latter devices are referred to as devices that are worn or held by the user, thereby enabling the respective device to participate in the described extended log-in procedure.

In FIG. 1 the user 100 is wearing a watch 120a, typically referred to as a smart watch, a communication enabled arrangement, arranged within a shirt, here referred to as a smart shirt 120b, and communication enabled glasses 120c, here referred to as smart glasses. Communication device 110 and all mentioned devises 120a, 120b, 120c worn by the user 100 all have in common that they allow capturing of physiological data, where at least one type of physiological data is common for communication device 110 and the other communication devices 120a, 120b, 120c, and that the latter devices are capable of communicating with communication device 110.

The scope of the claims as disclosed herein should not be limited by the preferred embodiments set forth in the given examples, but should be given the broadest interpretation consistent with the description as a whole.

It is to be understood that in the examples given below, a communication device on which a user has actively and successfully logged-in, from thereafter will operate as what is herein referred to as a primary device, while any other communication device on which the user has not actively logged-in and which is capable of communicating with the primary device, will operate as a secondary device. Furthermore, communication devices which are capable of communicating with each other for executing extended log-in as described herein will typically also be able to dynamically take the role as a primary or secondary device. This also means that a secondary communication device, which has been logged-in by applying an extended log-in procedure, may act as, and, thus, become a primary device, enabling extended log-in towards other secondary communication devices. Alternatively, only pre-defined devices will be able to act as primary devices.

According to a first embodiment, which will now be described in further detail with reference to the signalling scheme of FIG. 2, a first communication device, on which a user has logged in to a service or platform, will assist one or more additional communication devices, which, after having captured physiological data, are considered to be held or worn by the user, thereby extending the log-in also to the one or more additional communication devices, capable of communicating with primary device A, i.e. once an additional communication device has been approved for extended log-in by the first communication device, the additional communication device will receive log-in credentials which can be used by the additional device for extended log-in, from the primary device, i.e. log-in credentials will be provided to the communication device to which log-in is extended, without requiring any input of log-in details to be provided by the user.

The method according to the embodiment as described with reference to FIG. 2 may e.g. be beneficial in situations where a user wants to be able to extend a log-in procedure already executed on a communication device to one or more communication devices simply by putting on a communication device which is adapted for the suggested extended log-in procedure.

Figure 2:
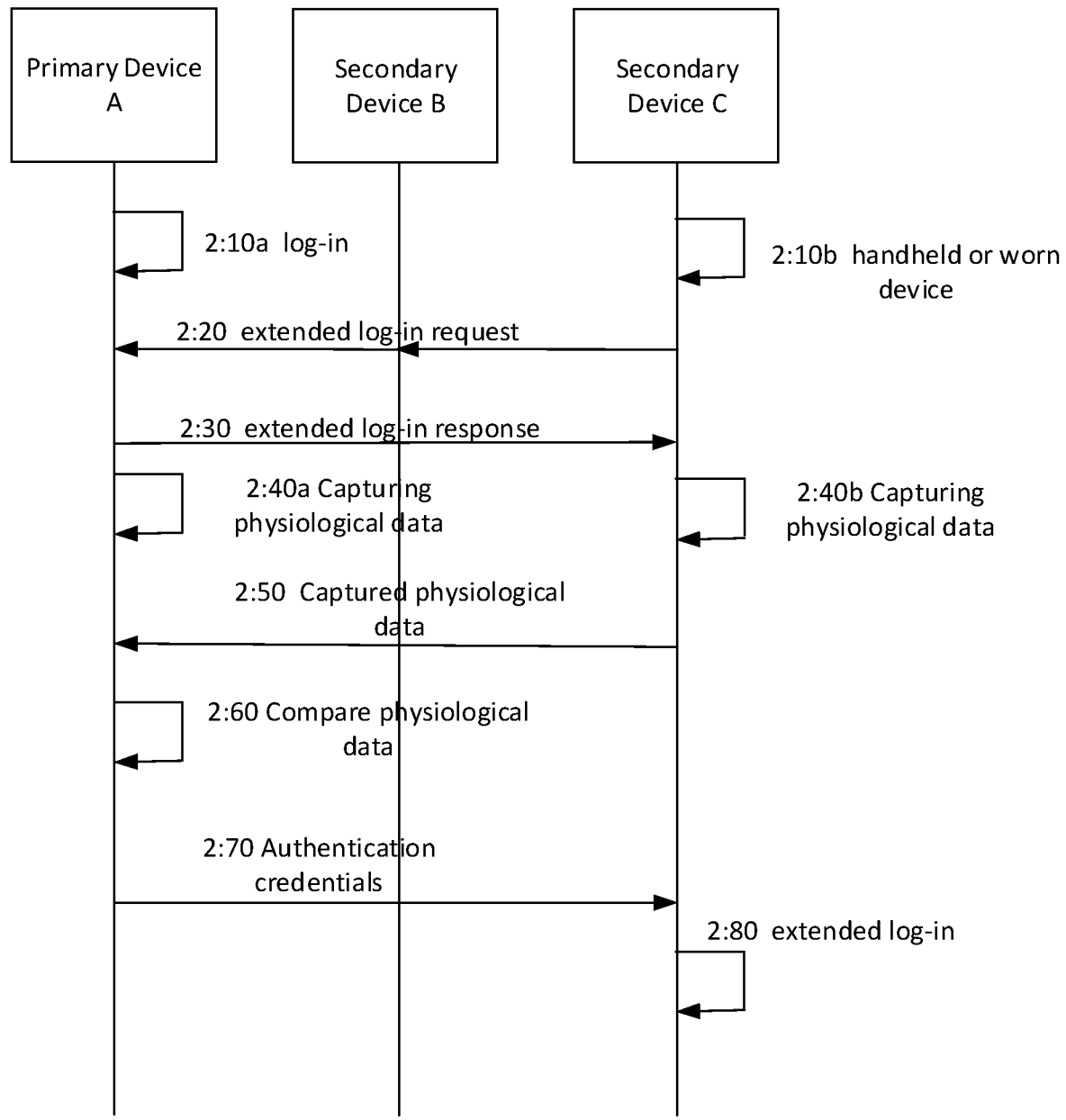
FIG. 2 is a signalling scheme illustrating how a log-in can be extended from a primary communication device to a secondary communication device according to a first embodiment.

In a first step 2:10a of FIG. 2, a user of a communication device, here referred to as primary device A, is successfully completing a log-in procedure to a service or platform, via a user interface of primary device A in a conventional manner, e.g. by entering a password into a field presented to the user on a display of primary device A. Simultaneously, or after primary device A has been logged-in, the user puts on a communication device, here referred to as secondary device C. Secondary device C recognizes that it is worn or held by the user, by sensing close vicinity to the user's body via one or more appropriate sensors, as indicated in step 2:10b. The recognition that the secondary communication device is worn or held by the user is possible by having a process which is automatically sensing contact with the body of the user via at least one sensor of a first sensor type, capable of sensing that the secondary communication device is in contact with, or in close vicinity with, the body of the user. More specifically, the first type sensor/s is/are capable of sensing contact with, or close vicinity to, a body via the skin, hair, nails or any other parts of the body via which physiological data can be captured. In the latter case, a first type of sensor of a communication device, arranged within a shirt, together constituting what can be referred to as a smart shirt, will be able to capture data indicating whether or not the shirt is worn by a user by allowing a tolerance basically corresponding to the thickness of the shirt.

Step 2:10b can be executed automatically, without requiring any interaction from the user, other than attaching it to the body so that body contact is detected. Alternatively, the user is requested, e.g. visually or audible, via any type of available user interface, if the user wish to initiate extended log-in.

In the present example, secondary device B is either not worn or held by the user, or it is not in sufficient close vicinity to the user to activate any alert, corresponding to step 2:10b. Consequently, in the illustrated scenario communication device B will not be able to make benefit of an extended log-in, based on the log-in already completed at primary device A.

Once it has been determined by secondary device C that it is handheld or worn by the user of primary device A, secondary device C transmits a request, here referred to as an extended log-in request, to primary device A, as indicated with step 2:20. Such a request can be communicated via any type of available wireless communication, such as e.g. Near Field Communication (NFC), WiFi IEEE 802.11, Bluetooth, IEEE 802.15.4, Light Field Communications (LFC) or any other forms of non-wireless communication, such as e.g. via capacitive or magnetic Human Body Communications. The extended log-in request can be transmitted automatically, or can, as a selectable option, following a positive response to another request to the user, be presented to the user e.g. visually or audibly via an appropriate user interface, requesting the user whether extended log-in is required or not, or if the user prefer to log-in in a conventional way, or if the user prefer to log-in in a conventional way. In its simplest case the latter request could comprise a trigger to initiate a response by the primary device. Such a simplified request will be applicable e.g. if the primary device is fully aware of which type of second type sensors are available at the respective secondary device for a subsequent capturing of physiological data, so that the primary and secondary device will be capturing corresponding, comparable data. However, in case the primary device is not fully aware of which sensors or sensor types that are available for capturing of physiological data, the request may comprise information on second type sensors which are available for capturing physiological data at the secondary device.

Once the primary device A has recognised a request from a secondary communication device, here secondary device C, a response, here referred to as an extended log-in response, is transmitted to the secondary device C, as indicated in step 2:30. The extended log-in response is typically transmitted via the same means of communication as was used in step 2:20, but alternatively another means of communication available to both devices may be used. The extended log-in response comprise instructions or data sufficient for secondary device C to initiate capturing of physiological data, typically by initiating measurements, via one or more sensors of a type here referred to as second type sensors. In its simplest case, the extended log-in response may comprise a trigger to initiate measuring by one or more second type sensors. Alternatively, the mentioned response may comprise more detailed information e.g. on one or more of: a combination of a plurality of different second type sensors, capable of capturing different data types, a time when, or time interval after which, at least one sensor is to be used for capturing or measuring certain data. If more than one secondary device respond to the primary device, naturally an extended log-in response will be sent to the primary device from each responding secondary device By second sensor type we hereby refer to a type of sensors which are capable of sensing physiological data, while the first sensor type mentioned above refer to sensors capable of sensing contact with, or close vicinity with, the body of the user.

As indicated in step 2:40*a* and 2:40*b*, both devices involved in the described extended log-in procedure will be capturing physiological data, either according to pre-configured routines, or according to instructions provided in the response of step 2:30, or according to a combination of both. A specific group of devices may e.g. have been pre-configured e.g. during sales or later, so that any device belonging to that specific group of devices will be able to recognize another device of the same group, e.g. from a known ID transmitted in one or more of steps 2:20 and 2:30. In the latter case, a prerequisite for being registered to the same group of devices may be that both devices comprise corresponding sensors.

It is to be understood that even though primary device A does not need to be in contact with, or in close vicinity to, the body of the user most of the time the mentioned process is executed, the latter state is of course required at least during the time when physiological data is captured by primary device A in step 2:40*a*. This may be instructed to the user e.g. visually or audibly, via a suitable user interface, prior to scheduled capturing of data. Correspondingly, insufficient contact with the body could be indicated to the user via a user interface of the respective primary or secondary device, thereby instructing that capturing must be repeated, before a successful automated log-in procedure can be completed.

As indicated above, capturing of physiological data may be executed synchronously, if agreed in the communication according to steps 2:20 and 2:30 between a primary and secondary device, or asynchronously. Whether synchronous or asynchronous capturing of data is to be applied typically will depend on what type of data, or combination of data, that is captured and to what extent such data can be tied to the same user. Even though we here refer to physiological data, it is to be understood that physiological data may be combined also with other types of data captured by sensors. By way of example, the primary and secondary device involved in an extended log-in procedure may be capable of generating a signal, such as e.g. a vibration and/or magnetic signal, which is captured by one or more applicable sensors and combined with physiological data.

As indicated in step 2:50, captured physiological data, possibly combined with additional captured data, is provided from secondary device C to primary device A, again typically via the same means of communication as used in previous communication between the two devices, or via separate means of communication. Even though step 2:40*a* and 2:40*b* are indicated as one respective capturing event and step 2:50 is indicated as one single transmission event for transmitting captured data, it is to be understood that capturing of data and/or subsequent transmissions may be executed into a plurality of separate events, e.g. in order to improve the accuracy of the retrieved data, by repeatedly execute specific capturing/measurements at a certain time interval.

As indicated in a subsequent step 2:60, the physiological data captured by primary device A is compared to corresponding data captured by secondary device C. Again, it is obvious that such a procedure will be repeated for each secondary device which is participating in an automated log-in procedure. If the mentioned comparison result in a match, i.e. the compared data correspond to each other within a predefined error margin, the data provided from secondary device C is considered to origin from the same user as the data captured by primary device A, and, thus, it is decided by primary device A that secondary device C can be logged based on credentials provided from primary device A, without requiring any user interaction from the user, other than possibly acceptance to execute the described automated log-in procedure, if such a procedure is also applicable. Consequently, in case of a match, primary device A will transmit authentication credentials required for the requested log-in to secondary device C, as indicated in step 2:70. In case one or more secondary devices are to be involved in an extended log-in, step 2:70 is repeated also for each of these secondary devices.

In case of a match, as described above, what could be referred to as a pairing between the involved primary and secondary device is achieved. These two devices then form a chain, which can be referred to as a connected graph, which enables the log-in executed by the user of the primary device to be extended also to the respective secondary device.

In a final step 2:80, secondary device C is logging-in to the respective service. By applying the mentioned method, each device, operating as a secondary device will be capable of logging-in to a service or platform in a simplified manner, since the user will only need to insert credentials, such as e.g. a username and password once, after which all further devices, which are capable of participating in the described process, which are worn or held by the user when the user logs-in the primary device to a service or platform, may have logged-in also one, some or all of the secondary devices, without having to insert any further credentials.

Figure 3:
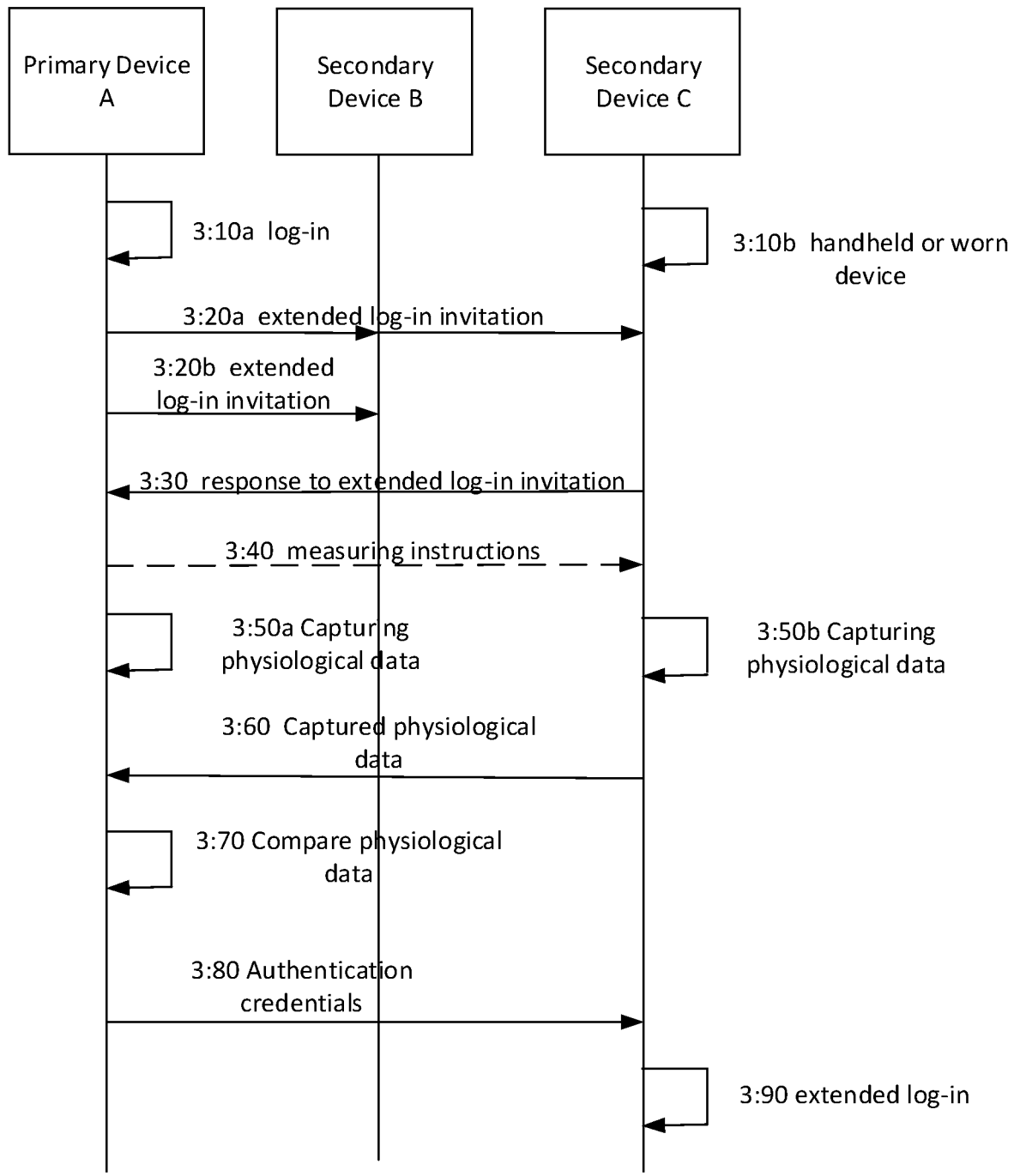
FIG. 3 is signalling scheme illustrating how a log-in can be extended from a primary communication device to a secondary communication device according to a second embodiment.

FIG. 3 is illustrating how devices can apply extended log-in according to an alternative embodiment, where, instead of initiating extended log-in from devices which are held or worn by a user but that have not yet been logged-in, extended log-in is triggered from a device which is acting as a primary device, i.e. a device on which a user has logged-in to a service or platform. The latter embodiment may be beneficial for obtaining a simple and fast log-in procedure for devices already worn or held by a user by the time the user logs-in to a service in a conventional manner via another device.

In a first step 3:10*a* of FIG. 3 a user of primary device A, is successfully completing a log-in procedure to a service or platform via a user interface of primary device A. Primary device A, then automatically sends out a request, here referred to as an extended log-in request, indicated as step 3:20*a* and 3:20*b* in the figure, to all communication devices within range of primary device A, requesting if any of these communication devices requires extended log-in according to the present embodiment. In the present example only two secondary devices are receiving the request, but it is to be understood that more devices, worn or held by the same user could receive such a request. Similar means of communication, or alternative means of communication, may be used as was suggested above for the first embodiment.

In the present situation, secondary device C, sometime before reception of the invitation, sent out in step 3:20*a*, determines that it is held or worn by the user of primary device A, as indicated by step 3:10*b*, where one or more sensor of secondary device C senses and indicates this to the device, which thereby activates a response to the request from primary device A, here referred to as an extended log-in response, as indicated with step 3:30. In FIG. 3 such a response is activated and transmitted automatically, but alternatively, the user may be alerted with a request, provided e.g. as a visual request on a display or as an audible request via a speaker of secondary device C, requesting the user if extended log-in is requested. In the latter case, the user may select extended log-in, whereby the procedure described in FIG. 3 is continued with step 3:30, or the request can be rejected by the user, whereby the described process is terminated, with respect to secondary device C. In the latter case, the user may also have the option to instead choose to log-in manually, i.e. without the involvement of primary device A.

In FIG. 3, secondary device B is neither handheld, nor worn by the user, and, thus, this device will not be able to respond to the request. More specifically, the present embodiment will only be applicable to secondary devices, which are already worn or held by the user at the time of log-in of the primary device. However, as soon as the secondary device B is found to be worn or held by the user, a procedure corresponding to the one described with reference to FIG. 2 may be initiated from secondary device B, if such an embodiment is applicable in addition to the described second embodiment.

In an optional step 3:40, primary device A may respond to the response provided in step 3:30 by providing an instruction to secondary device C, by instructing secondary device C on how to proceed with the described extended log-in procedure, by providing information on e.g. what type of physiological data to measure, i.e. what type of sensors to activate, and possibly also when to activate the sensors so as to measure the requested data at a certain time or at certain time intervals. In the latter situation, primary device A may e.g. require synchronous measurement of e.g. the users hart beat, thereby verifying, with a higher probability, that the heart beat measured by the primary device and the secondary device originate from the same individual/user. Instructions to combine certain captured physiological data in a certain way may also improve the accuracy when the results are later matched. Alternatively, measurement instructions, e.g. such as the ones suggested above, could have been provided already in the request transmitted in step 3:20*a, b*, or such information may have been pre-configured at the respective devices.

As is indicated in subsequent steps 3:50*a* and 3:50*b*, the primary device A and all secondary devices which have responded to the request, here only secondary device C, perform the requested measurements by capturing relevant physiological data accordingly. Secondary device C captures physiological data according to instructions provided from primary device A, or already available at secondary device C. Depending on the valid instructions such capturing will be executed coordinated with primary device A or independently of primary device A. In a next step 3:60, captured data is provided to primary device A, which responds by comparing the received physiological data to its own captured data, as indicated in step 3:70. It is to be understood that the devices may be instructed to measure only one type of data, by using only one type of sensors, or a plurality of data types, captured by one or more different types of sensors. By requiring a combination of a plurality of different types of physiological data to be measured, the match may be more trustworthy.

In case more than secondary device C would participate in the described extended log-in procedure, also data provided from this/these device/es would have been compared accordingly. If a comparison between a primary and a secondary device is successful, i.e. the compared data match within a given tolerance, it is determined that the secondary device is approved for an extended log-in and relevant log-in credentials are sent to the respective secondary device, here secondary device C, as indicated in step 3:80. The latter procedure is repeated for each secondary device for which a match is verified. Once the authentication credentials have been provided to the relevant secondary device, this secondary device, here secondary device C, will be able to initiate an extended log-in procedure, based on the acquired log-in credentials, as indicated in step 3:90.

Secondary device C will maintain logged-in until secondary device C senses, via the first type sensor/s that it is no longer in contact with, or in close vicinity of, the user, or until it is logged-out manually.

Figure 4:
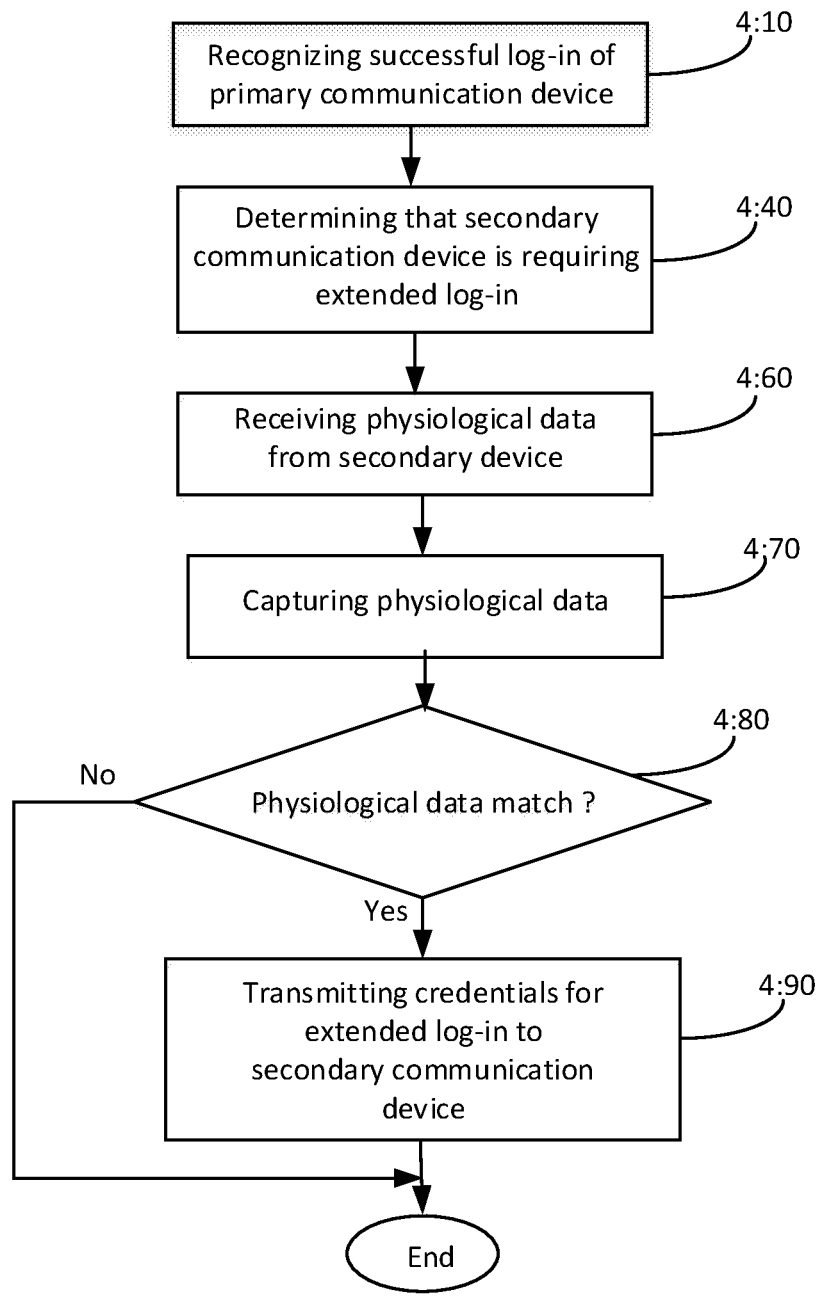
FIG. 4 is a flow chart, illustrating a method executed on a primary communication device.

FIG. 4 is a flow chart illustrating a method executable in a primary device, or what can be considered as a primary device, once a user has logged-in to a service via the device and an extended log-in request has been received. In a first step 4:10 a user is logging-in on the primary device in by entering required authentication credentials. In a next step 4:40 it is determined, by the primary device, that the secondary device is requiring extended log-in. As will be explained in further detail below, this can be determined by executing a communication exchange between the primary communication device and the secondary device.

Once the secondary device has captured and transmitted required physiological data, this data is received by the primary device, as indicated in step 4:60, and in another step 4:70 the primary device itself is capturing corresponding physiological data. As already mentioned it is to be understood that steps 4:60 and 4:70 could be executed in the reverse order or more or less in parallel. In another step 4:80, the physiological data originating from both devices is compared, and in case of a match, log-in credentials are transmitted to the secondary device, as indicated in step 4:90, while in case of no match, the process is terminated, alternatively a message (not shown) indicating the denial of automated log-in is transmitted to the secondary device.

Figure 5:
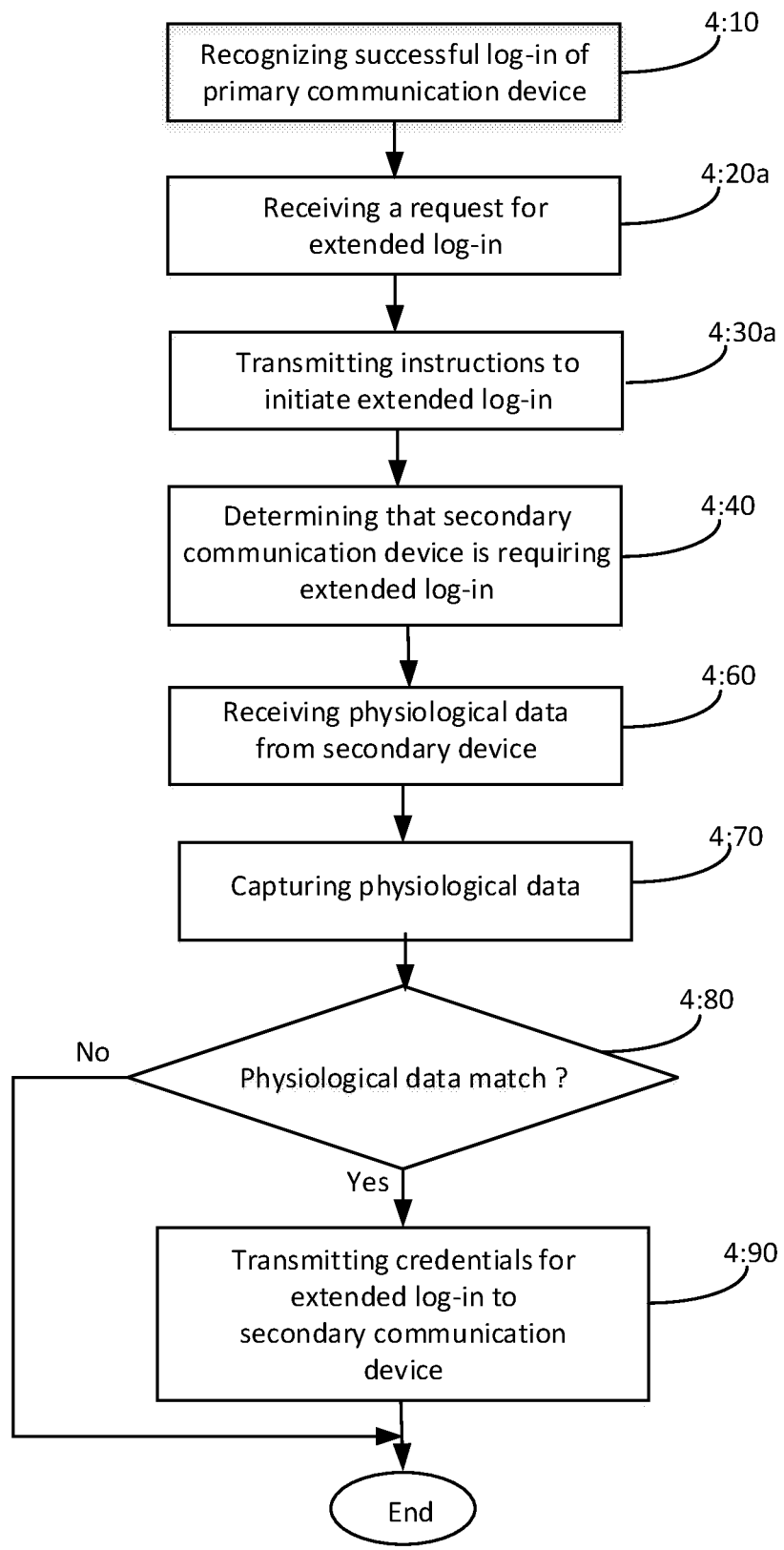
FIG. 5 is another flow chart, illustrating the method of FIG. 4, according to a first embodiment.

FIG. 5 is describing the method as described above, with reference to FIG. 4, in further detail, when executed according to the first embodiment, described above, with reference to FIG. 2. As can be seen, most steps of FIG. 5 correspond to the steps of FIG. 4. However, prior to step 4:40, where it is determined that the secondary device is requiring extended log-in, the primary device received a request for extended log-in from the secondary device, as indicated in step 4:20*a*, and in a subsequent step 4:30*a*, the primary device transmits instructions to the secondary device, instructing the secondary device to initiate the extended log-in procedure, as described herein. Such instructions may in it's simplest embodiment comprise a trigger for the secondary device to initiate extended log-in, or it may also comprise more detailed instructions, instructing the secondary device under which conditions to execute the procedure needed for the extended log-in. If plural requests are received, step 4:20*a* and the following steps will be executed in parallel for each such received request. According to one embodiment, the request, provided from the secondary device, may comprise information, specifying one or more types of sensors, which are accessible to the secondary device for capturing physiological data.

Figure 6:
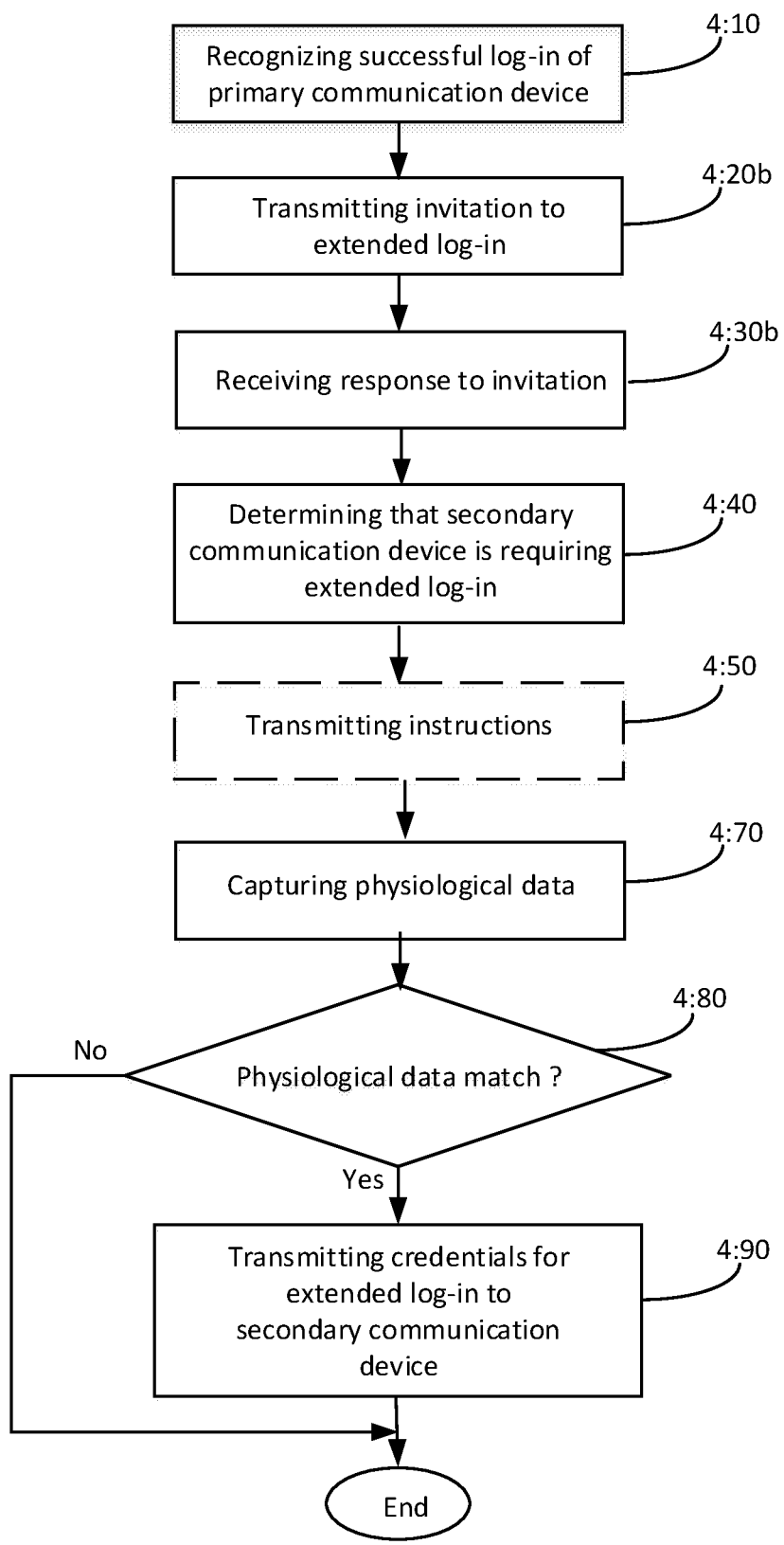
FIG. 6 is yet another flow chart, illustrating the method of FIG. 4, according to a second embodiment.

FIG. 6 is also describing the method as described above, with reference to FIG. 4, but when executed according to the second embodiment, as described with reference to FIG. 3. Again most steps are equivalent as in FIG. 2, but prior to step 4:40, the primary device transmits an invitation to extending the log-in from the primary device to any secondary device which is enabled to participate in the suggested extended log-in, as indicated in step 4:20b, and in a subsequent step 4:30b, the primary device receives a response to the request from a secondary device. While the extended log-in according to the first embodiment is initiated by a secondary device, the extended log-in procedure according to the second embodiment is initiated by the primary device from which the log-in is to be extended. Furthermore, according to this embodiment, the primary device can transmit instructions to the secondary device, instructing the secondary device on how to perform the extended log-in, as indicated in optional step 4:50. The suggested optional instructions, may according to one embodiment comprise instructions to the secondary device, instructing the secondary device to synchronize capturing of the physiological data, with the capturing of the second physiological data executed by the primary device. Alternatively, or in addition the instructions may comprise instructions, instructing the secondary device on which one or more types of sensors to use for the capturing the physiological data.

Figure 7:
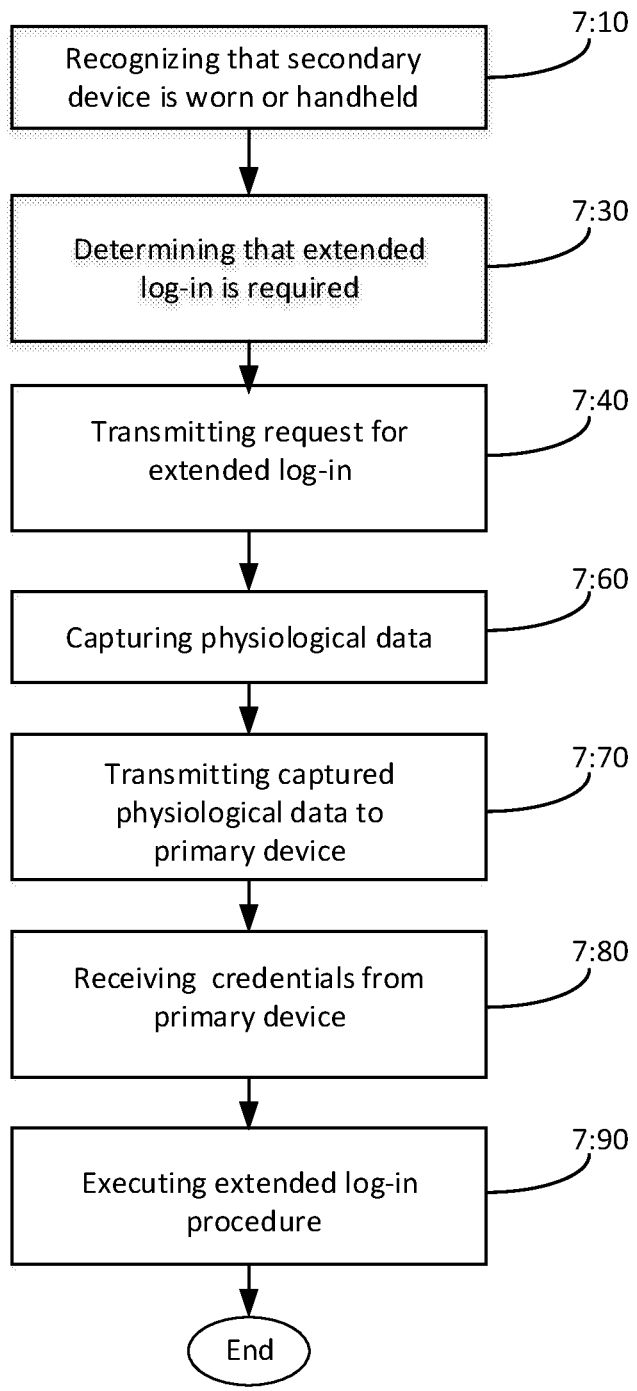
FIG. 7 is a flow chart, illustrating a method executed on a secondary communication device.

FIG. 7 is another flow chart, illustrating a method according to the first embodiment, as illustrated above with reference to FIG. 2, executable on a device, acting as a secondary device.

In a first step 7:10, it is recognized by the secondary device that it is worn or handheld by a user. This is achieved by one or more sensors, sensing contact with or close vicinity to a human body. In a next step 7:30, it is determined that the secondary communication device require log-in of the primary communication device to be extended to the secondary communication device. Again, such a determination can be based on different information, as will be explained in further detail below. In a next step 7:40, a request for extended log-in is transmitted to the primary device, and in a further step 7:50, a response to the request is received from the primary device, in the form of instructions for the secondary device to initiate the requested extended log-in. As will be further explained below, such instructions may, in addition to a trigger to initiate the extended log-in, also comprise more detailed instructions on how to execute the extended log-in procedure.

In a further step 7:60, the secondary device is capturing physiological data, either according to pre-configured instructions, according acquired instructions, or according to a combination of both, and in a subsequent step 7:70, the physiological data is transmitted to the primary device.

In case of a match between the physiological data from the two devices, an extended log-in process will be accepted by the primary device, and, thus, in such a situation, credentials are received in another step 7:80, and in a subsequent step 7:90, the secondary device can execute an extended log-in procedure, i.e. a log-in procedure based on the acquired credentials. Such a log-in procedure may be executed via any type of available wireless communication system to which the secondary device has access, following procedures normally used for wireless log-in, such as e.g. NFC, WiFi, IEEE 802.11, Bluetooth, IEEE 802.15.4, or LFC. In case of no match in the mentioned comparison of physiological data, the process will be terminated after step 7:70, possibly after a message, indicating failure to perform extended log-in, has been provided from the primary communication device to the secondary communication device.

Figure 8:
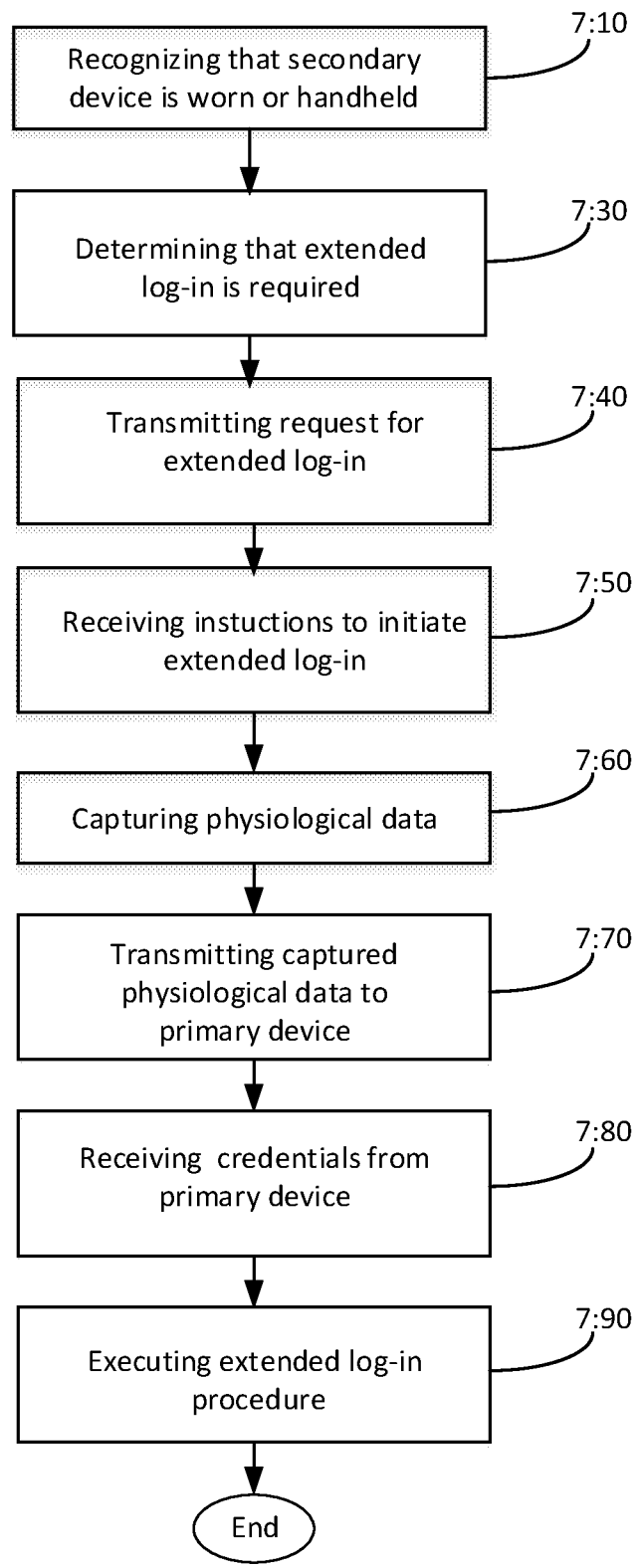
FIG. 8 is a flow chart, illustrating the method of FIG. 7, according to a first embodiment.

The method disclosed above, with reference to FIG. 7, according to a first embodiment, will now be described in further detail, with reference to FIG. 8. As can be seen in FIG. 8, are equivalent to corresponding steps in FIG. 7

However, according to this embodiment, the secondary device is capable of determining in step 7:30, that an extended log-in is required, once it has recognized, in step 7:10, that the secondary device is worn or handheld. Such a determination results in the transmission of a request for extended log-in to the primary device, as indicated in step 7:40, followed by reception of a response to the request from the primary device, comprising instructions, instructing the secondary device to initiate extended log-in. The described method is then completed corresponding to what has been described above, with reference to FIG. 7

Figure 9:
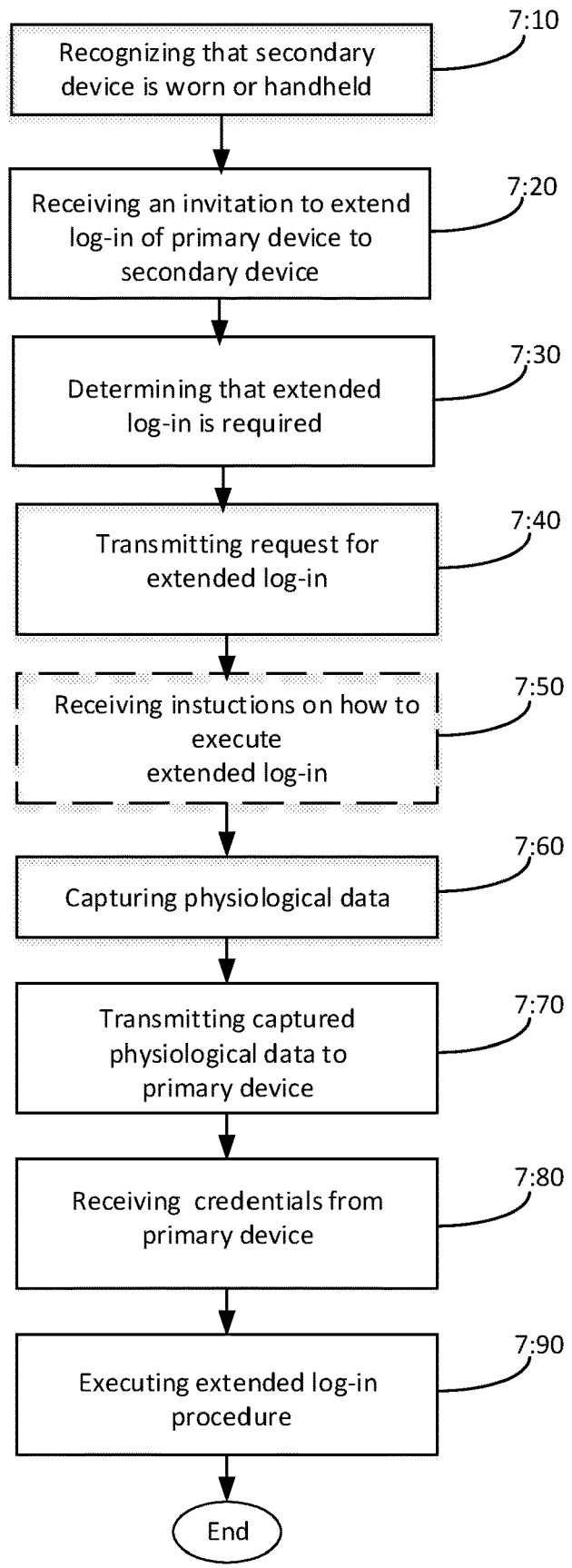
FIG. 9 is a flow chart, illustration the method of FIG. 7, according to a second embodiment.

The method disclosed above, with reference to FIG. 7, according to a second embodiment, will now be described in further detail, with reference to FIG. 9. As can be seen in FIG. 9, are equivalent to corresponding steps in FIG. 7

In the present embodiment, the secondary device receives an invitation to extend log-in of the primary device, as indicated in step 7:20. The secondary device is capable of recognizing and responding to such a request due to that it has previously recognized that the secondary device is worn or handheld in step 7:10. Once the secondary device has determined that extended log-in is required, according to step 7:30, it transmits a request for extended log-in to the primary device, as a response to the invitation of step 7:20, as indicated with step 7:40. The secondary device may also, optionally receive further instructions on how to execute the extended log-in. Alternatively, corresponding instructions may have been provided in step 7:20, or may have been pre-configured at the secondary device. According to one embodiment, the instructions may comprise instructions, instructing the secondary device on which one or more types of sensors to use for the capturing the physiological data.

Figure 10:
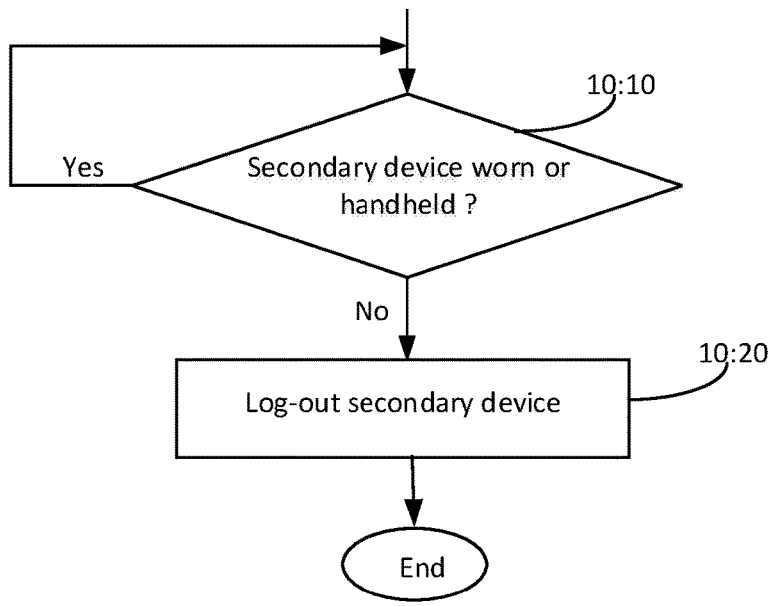
FIG. 10 is a flow chart illustrating a continuation of the method as illustrated in FIG. 7-9.

FIG. 10 is a flow chart illustrating a process following a successful extended log-in, according to any of FIG. 2-8. As indicated in step 10:10, the secondary device is determining whether or not the device is still handheld or worn. The latter situation implies that the secondary device is capable of sensing the present state with respect to contact with or vicinity to the body of the user, e.g. by monitoring the present situation on a continuous basis. If in step 10:10 it is determined that the secondary device is no longer worn or handheld, the secondary device is logged-out, as indicated in another step 10:20, and the process is terminated. It is to be understood, that in case the secondary device is a device which is capable of operating as a primary device, it will be able to operate as such, so that it can extend its log-in to one or more other secondary devices as long as it is maintained in step 10:10.

A communication device capable of operating a s a primary communication device, according to a first embodiment, will now be described in further detail, with reference to FIG. 11, Such a communication device may be a smart phone, a pad or a wearable from which it is possible to log-in to a service or platform.

Figure 11:
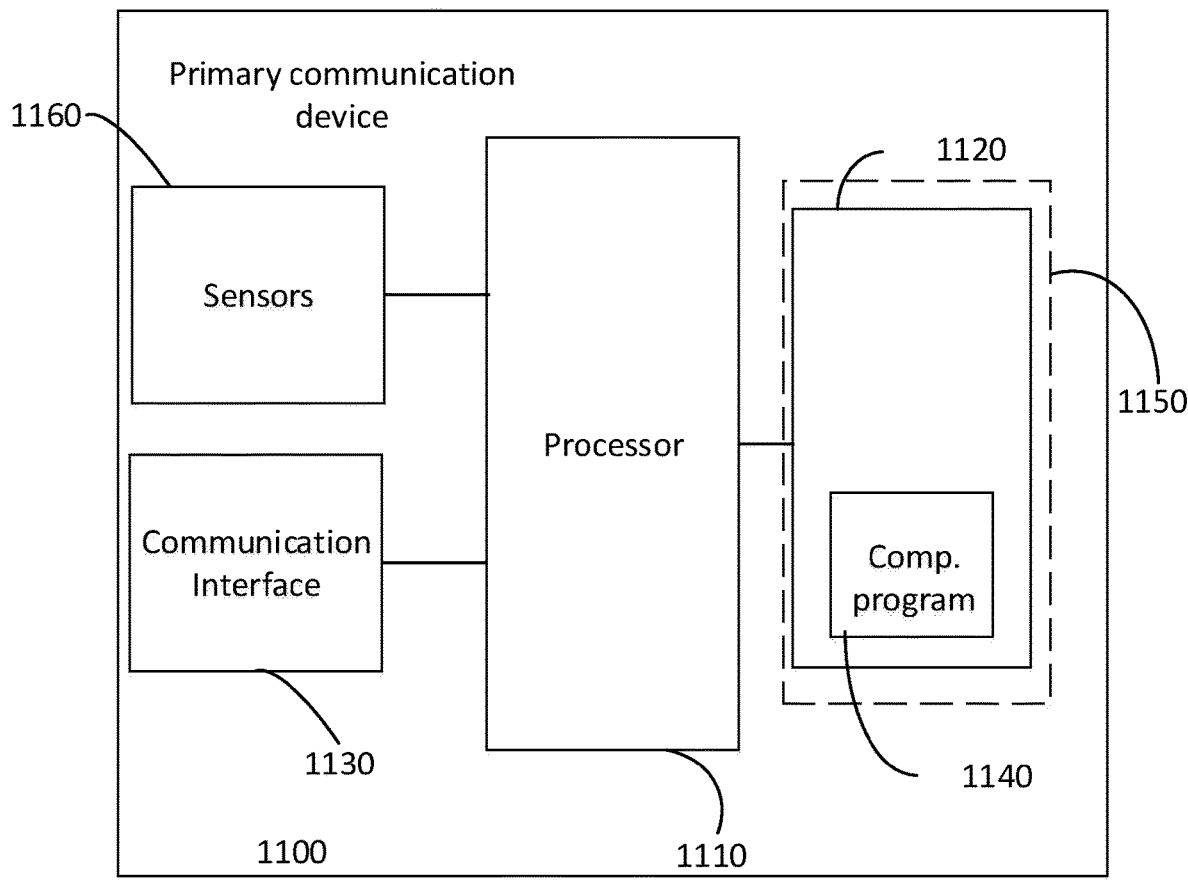
FIG. 11 is a block scheme illustrating a primary communication device, according to a first embodiment.

The primary communication device 1100 of FIG. 11 comprise a processor 1110 and a communication interface 1130, enabling the primary communication device 1100 to communicate with one or more communication devices, capable of operating as a secondary communication device, and to communicate with a on which the primary communication device can log in to a service or platform. The primary communication device 1100 also comprises a memory 1120, comprising computer readable instructions or code 1140, which is configured so that when executed by the processor 1110 it causes the primary communication device 1100 to perform a process, enabling a log-in of the primary communication device 1100 to be extended to the one or more secondary communication devices. The primary communication device 1100 also comprise one or more sensors 1160, capable of sensing both whether or not the primary communication device is in physical contact, or in close vicinity to a human body, and to capture physiological data via the same human body.

More specifically the computer readable code is configured so that when executed by the primary communication device 1100 it causes the primary communication device 1100 to recognize a successful log-in of the primary communication device, after which it determines that the secondary communication device require the log-in of the primary communication device to be extended to the secondary communication device. As will be described below, such a determination may be executed in different, alternative ways.

The computer readable code is further configured so that when executed by the primary communication device 1100 it causes the primary communication device 1100 to receive physiological data associated with the user of the secondary communication device from the secondary communication device, via the communication interface 1130, where the received physiological data is data which has been captured by at least one sensor of the secondary communication device, via the body of the mentioned user. After or before receiving the physiological data from the secondary communication device, the primary communication device is also caused to capture physiological data sensed by at least one sensor of the primary communication device 1100 via the body of the mentioned user, Thereby, both communication devices will be capturing corresponding, comparable physiological data, typically by measuring corresponding physiological data, or by receiving already measured physiological data, indicative of one or more physiological states of one and the same human being. Next the primary communication device is caused to compare the acquired physiological data and determining whether there is a match between the compared physiological data, i.e. if the physiological data captured by the primary communication device corresponds to the physiological data captured by the secondary communication device, at least within a given tolerance.

If it is stated by the primary communication device 1100 that the data matches, the primary communication device is caused to transmit at least one credential, required by the secondary communication device for extending the mentioned log-in to the secondary communication device, to the secondary communication device, via the communication interface 1130, thereby enabling the secondary communication device to perform a log-in procedure, based on the acquired log-in credentials, whereas no credential is transmitted to the secondary device in case no match is determined. More specifically, all credentials, e.g. the user identity and password previously used by the primary communication device are provided to the secondary communication device at this stage. If higher security is required during such an exchange of credentials, where transmission of credentials, such as user identity and password shall not have to be sent in plaintext, any type of known algorithm may instead be used so that instead encrypted credentials are sent to the secondary communication device, which is then capable of decrypt the received credentials. Such algorithms are however out of the scope of the described method, and will therefore not be mentioned in any further detail herein.

According to one embodiment, the primary communication device 1100 is caused to determining that the secondary communication device require the log-in of the primary communication device to be extended to the secondary communication device, based on a request for extending the log-in of the primary communication device 1100 to the secondary communication device, received from the secondary communication device, via the communication interface 1130. This means that the extended log-in procedure, according to this embodiment, is initiated by the secondary communication device. In response to the determining that extended log-in is required, the primary communication device 1100 is also caused to transmit an instruction to initiate the requested extended log-in, to the secondary communication device, via the communication interface 1130.

In the request, one or more types of sensors which are accessible to the secondary communication device for capturing the physiological data may be specified, if the secondary communication device is not already aware of this, e.g. from a pre-configuration of sensors suitable for extending log-in from the relevant primary communication device.

According to a second embodiment, the primary communication device is caused to make the mentioned determination that an extended log-in is required based on reception of a response from the secondary communication device, via the communication interface 1130, where the response is a response to an invitation to extend log-in of the primary communication device to the secondary communication device, sent from the primary communication device 1100, via the communication interface 1130.

In addition to simply instructing the secondary communication device to initiate extended log-in, the primary communication device may, alternatively also be caused to provide more detailed instructions to the secondary communication device, instructing the secondary communication device on how to execute the extended-log-in. According to one embodiment, such instructions may instruct the secondary communication device to synchronize capturing of the physiological data, with the capturing of the second physiological data executed by the primary communication device. Alternatively, or in addition, the instructions may comprise instructions, instructing the secondary device on which one or more types of sensors to use for the capturing the physiological data.

A computer program for enabling a primary communication device to communicate with a secondary communication device, so that extended log-in as described herein can be executed is also suggested, where the computer program 1140 of FIG. 11 comprises computer program code which when executed by at least one processor of the primary communication device causes the primary communication device 1100 to perform the method as described above, with reference to FIG. 4, 5 or 6.

A computer program product 1150, comprising a computer program 1140, such as the one mentioned above, and computer readable means on which the computer program 1140 is stored, may also be provided, e.g. in the form of a a flash memory, a RAM (Random-access memory) ROM (Read-Only Memory) or an EEPROM.

According to other embodiments, which will now be described in further detail with reference to FIGS. 12a and 12b, a primary communication device is configured as a device comprising a plurality of modules, which are capable of interacting with each other, so as to provide an opportunity for extended log-in as described herein.

Figure 12A:
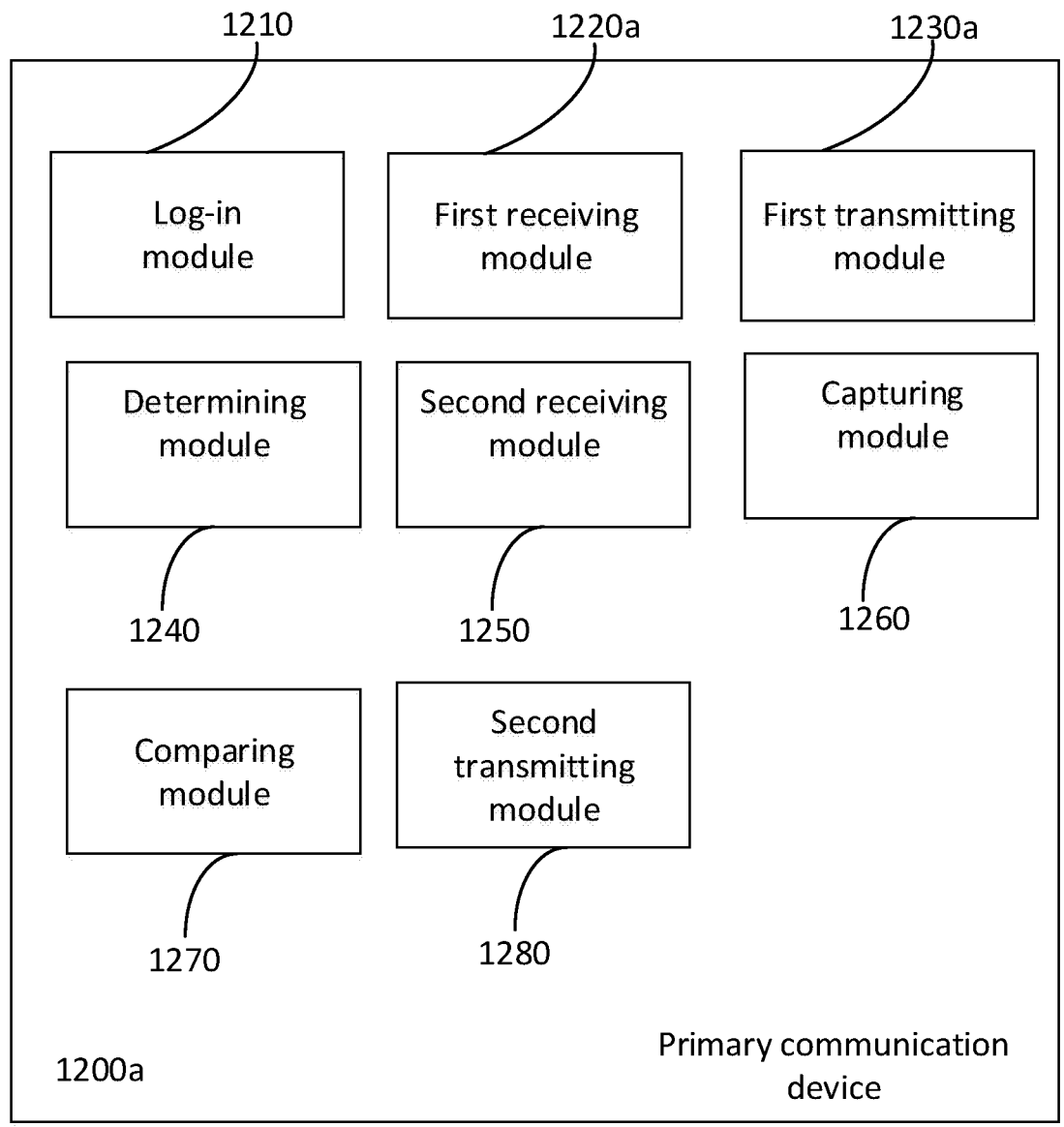
FIG. 12a is a block scheme illustrating a primary communication device according to another embodiment.
Figure 12B:
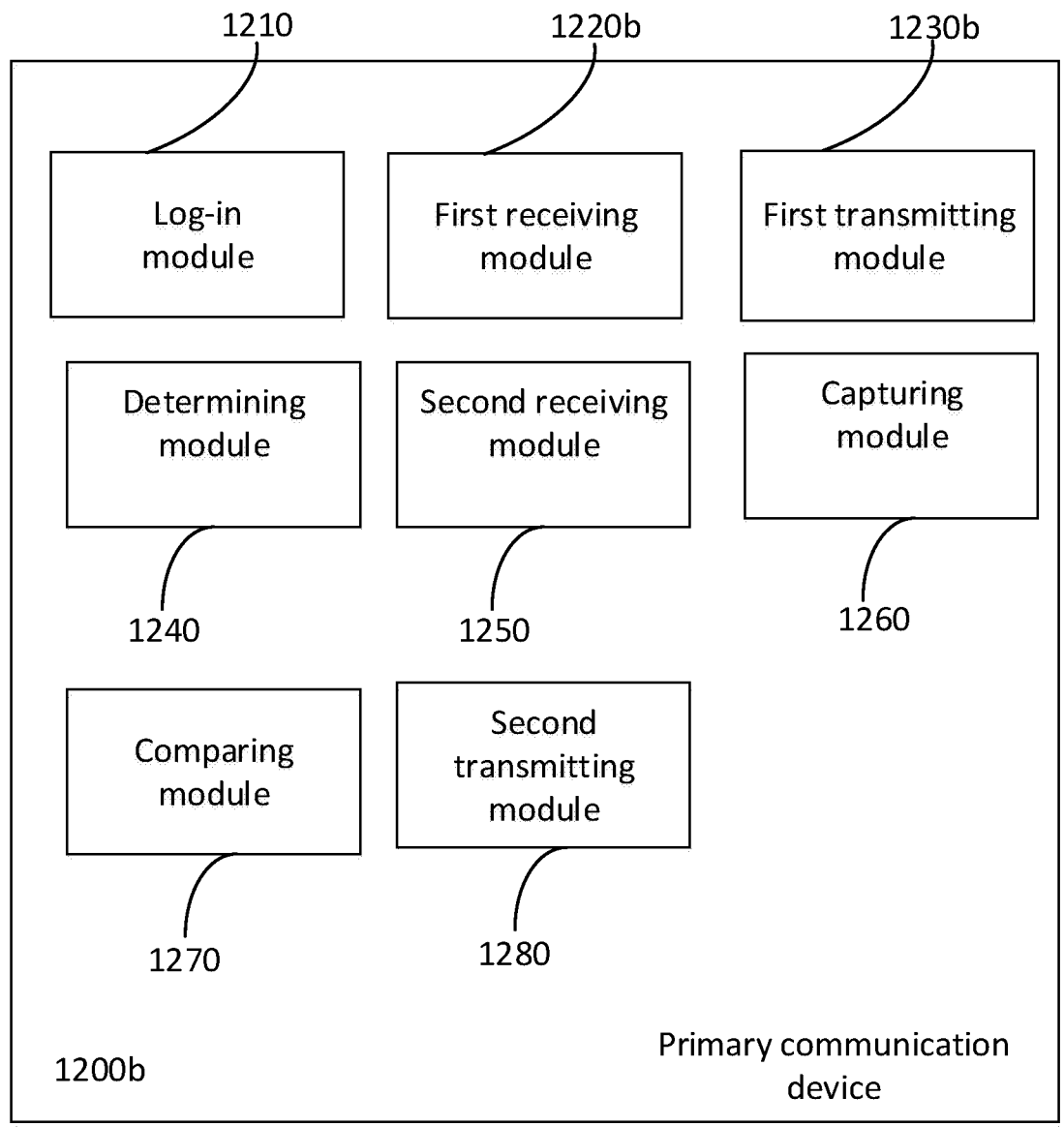
FIG. 12b is a block scheme illustrating a primary communication device according to yet another embodiment.

More specifically, the primary communication device of FIGS. 12a and 12b comprise log-in module 1210 for recognizing a successful log-in of the primary communication device, corresponding to step 4:10 of FIG. 4, 5 or 6. A determining module 1240 is provided for determining that the secondary communication device require the log-in of the primary communication device to be extended to the secondary communication device, corresponding to step 4:40 of FIG. 4. A second receiving module 1260 is provided for receiving physiological data associated with the user of the secondary communication device, from the secondary communication device, and captured by at least one sensor of the secondary communication device, via the body of the, mentioned user, corresponding to step 4:60 of FIG. 4, 5 or 6. A capturing module 1270 is provided for capturing physiological data sensed by at least one sensor of the primary communication device via the body of the user of the first communication device, corresponding to step 4:70 of FIG. 4, 5 or 6. A comparing module 1280 is provided for comparing the acquired physiological data and determining whether there is a match between the compared physiological data, corresponding to step 4:80 of FIGS. 4, 5 and 6, and a second transmitting module 1290 is provided for transmitting, at least one credential, required by the secondary communication device for extending the mentioned log-in to the secondary communication device, to the secondary communication device, in case there is a match between the compared physiological data, according to step 4:90 of FIG. 4, 5 or 6, whereas no credential is transmitted to the secondary device in case no match is determined.

According to one embodiment, a first receiving module 1220a is also provided for receiving request for extending the log-in of the primary communication device to the secondary communication device, from the secondary communication device, prior to determining that the secondary communication device require the log-in of the primary communication device to be extended to the secondary communication device, corresponding to step 4:20a of FIG. 5, and a first transmitting module 1230a for transmitting an instruction to initiate the mentioned requested extended log-in, to the secondary communication device, corresponding to step 4:30a of FIG. 5.

According to another embodiment, a first transmitting module 1230b is instead provided for transmitting, an invitation to extend log-in of the primary communication device to the secondary communication device, to the secondary communication device, prior to determining that the secondary communication device require the log-in of the primary communication device to be extended to the secondary communication device, corresponding to step 4:20b of FIG. 6, and a first receiving module 1220b for receiving, from a primary communication device, a response to the transmitted invitation, indicating a demand for extending the log-in from the primary communication device to the secondary communication device, corresponding to FIG. 4:30b of FIG. 6.

It is to be understood that in case a primary communication device is capable of operating both according to the first and second embodiment, corresponding to the methods as presented herein with reference to FIGS. 5 and 6, respectively, the primary communication device will be provided with both transmitting and receiving configurations, wherein either separate, or combine transmitting and receiving modules are provided.

A communication device capable of operating as a secondary communication device as described herein will now be described in further detail according to a first embodiment, with reference to FIG. 13.

Figure 13:
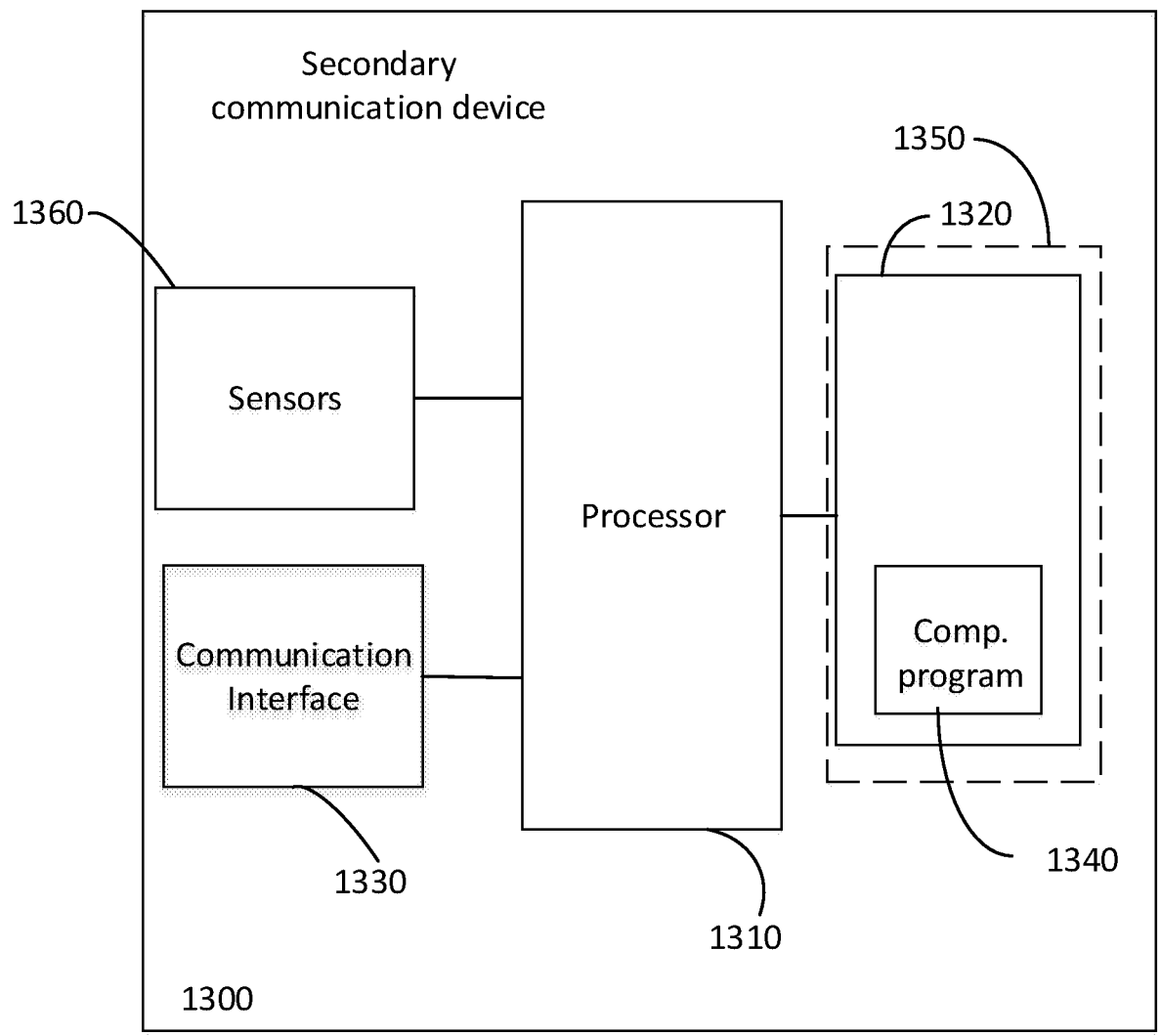
FIG. 13 is a block scheme illustrating a primary communication device, according to a first embodiment.

The secondary communication device 1300 of FIG. 13 comprise a comprise a processor 1310, a communication interface 1330 and a memory 1320, comprising computer readable code or instructions 1340, which when executed by the processor 1110 causes the secondary communication device 1300 to execute the method as described herein with reference to any of FIG. 7, 8 or 9.

More specifically, computer readable code is configured to cause the secondary communication device to recognize that the secondary communication device is worn or handheld, by capturing data via at least one sensor 1360, indicating that the secondary communication device 1300 is in contact with a human body. The secondary communication device is also caused to determine that the secondary communication device 1300 require log-in of the primary communication device to be extended to the secondary communication device. As will be described below, this can be determined in alternative ways. After having determined that extended log-in is required, the secondary communication device is caused to transmit a request for extending log-in of the primary communication device to the secondary communication device 1300, to a primary communication device, via the communication interface 1330. The secondary communication device 1300 is then caused to capture physiological data, sensed by at least one second type sensor via the body of the user of the secondary communication device, and to transmit the captured physiological data to the primary communication device, via the mentioned communication interface 1330. In case of a successful comparison of the physiological data with corresponding physiological data, captured by the primary communication device, the secondary communication device 1300 is caused to receive, and recognize, from the primary communication device, via the mentioned communication interface 1330, at least one credential, verifying that the physiological data captured by the secondary device match with the physiological data captured by the primary communication device, and to execute the extended log-in of the secondary communication device 1300, based on the at least one received credential.

According to one embodiment, the secondary communication device is caused to receive instructions, from the primary communication device, via the mentioned communication interface 1330, instructing the secondary communication device 1300 to initiate the extended log-in, in a situation where the request is a request which has been transmitted to the primary communication in response to determining, by the secondary communication device, that extended log-in is required by the secondary communication device.

The secondary communication device 1300 may also be caused to receive an invitation to extend a log-in of the primary communication device to the secondary communication device 1300, from the primary communication device, via the mentioned communication interface 1330, prior to determining that the secondary communication device require the log-in of the primary communication device to be extended to the secondary communication device. In the latter case, the extended log in procedure is initiated from the primary communication device. In the latter situation, the secondary communication device 1300 may caused to transmit the request as a response to the mentioned invitation. Furthermore, the secondary communication device may be caused to receive the mentioned instructions separately, or together with the invitation.

Alternatively to only instruct the secondary communication device to initiate an extended log-in, the instructions provided to the secondary communication device 1300 may also comprise instructions, instructing the secondary communication device on how to execute the mentioned, extended log-in.

The secondary communication device may be logged in as long as sensing functionality is capable of indicating that the secondary communication device is still worn or handheld. Therefore, the secondary communication device is also caused to recognize that the secondary communication device is no longer worn or handheld, by capturing data via at least one sensor 1360, indicating that the secondary communication device 1300 is no longer in contact with any human body, and to initiate log-out of the secondary communication device.

A computer program for enabling a secondary communication device to communicate with a primary communication device, so that extended log-in as described herein can be executed is also suggested, where the computer program 1340 of FIG. 13 comprises computer program code which when executed by at least one processor of the secondary communication device causes the secondary communication device 1300 to perform the method as described above, with reference to FIG. 7, 8 or 9.

A computer program product 1350, comprising a computer program 1340, such as the one mentioned above, and computer readable means on which the computer program 1130 is stored, may also be provided, e.g. in the form of a a flash memory, a RAM (Random-access memory) ROM (Read-Only Memory) or an EEPROM.

According to other embodiments, which will now be described in further detail with reference to FIGS. 14*a* and 14*b*, a secondary communication device is configured as a device comprising a plurality of modules, which are capable of interacting with each other, so as to provide an opportunity for extended log-in as described herein.

Figure 14:
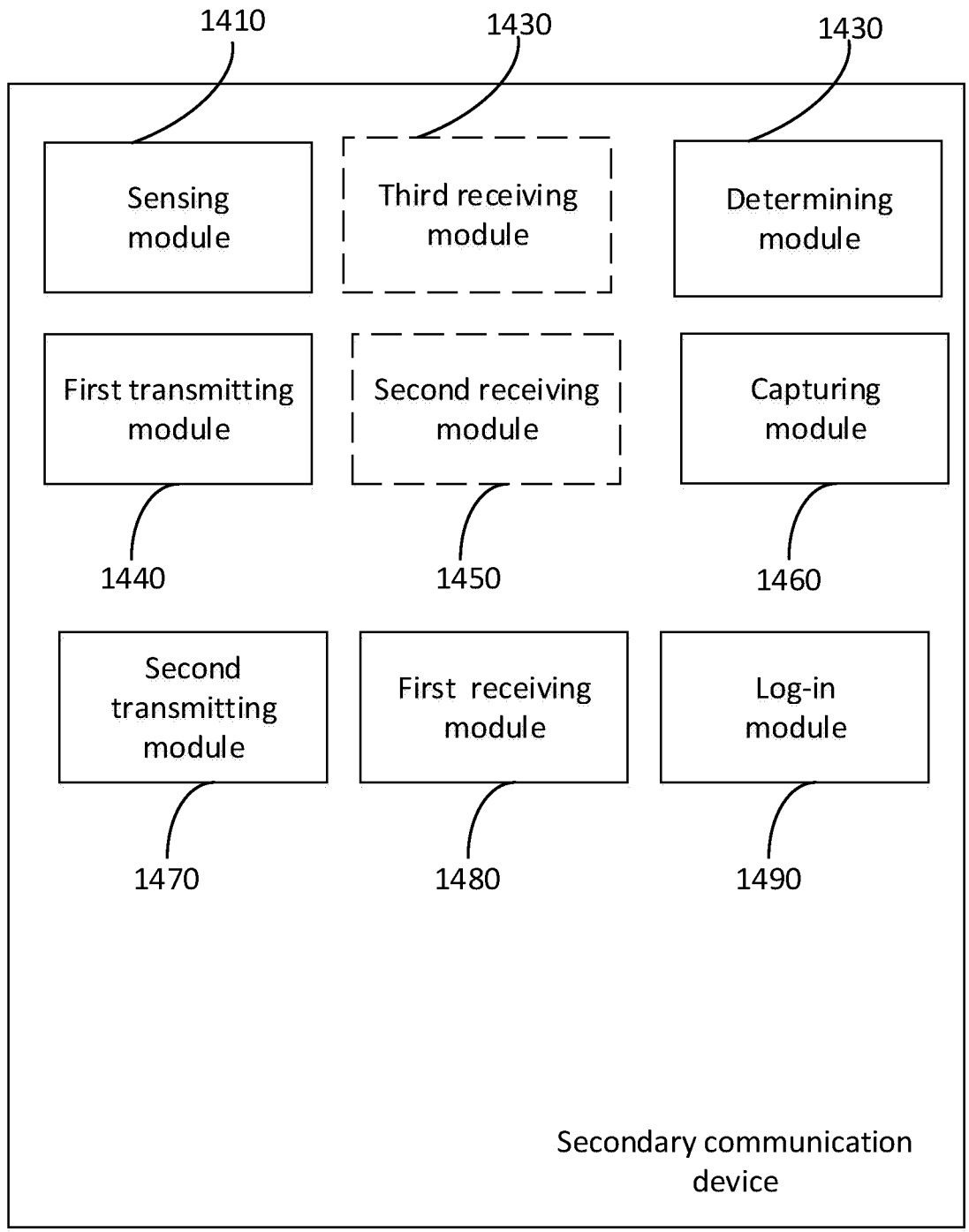
FIG. 14 is a block scheme illustrating a primary communication device according to two other embodiments.

More specifically, the primary communication device of FIGS. 14*a* and 14*b* comprise a sensing module 1410, provided for recognizing that the secondary communication device is worn or handheld, by capturing data via at least one sensor, indicating that the secondary communication device is in contact with a human body, corresponding to step 7:10 of FIG. 7, 8 or 9. A determining module 1430, provided for determining that the secondary communication device require log-in of the primary communication device to be extended to the secondary communication device, corresponding to step 7:30 of FIG. 7, 8 or 9. A first transmitting module 1440 is provided for transmitting a request for extending log-in of the primary communication device to the secondary communication device, to a primary communication device, corresponding to step 7:40 of FIG. 7, 8, or 9. A capturing module 1460 is provided for capturing physiological data sensed by at least one second type sensor via the body of the user of the secondary communication device, corresponding to step 7:60 of FIG. 7, 8 or 9. A second transmitting module 1470 is provided for transmitting the captured physiological data to the primary communication device, corresponding to step 7:70 of FIG. 7, 8 or 9. A first receiving module 1480 is provided for receiving, from the primary communication device, at least one credential, verifying that the physiological data, captured by the secondary device, match with the physiological data, captured by the primary communication device, corresponding to step 7:80 of FIG. 7, 8 or 9, and a log-in module 1490 is configured for executing the mentioned extended log-in of the secondary communication device, based on the at least one received credentials, corresponding to step 7:90 of FIG. 7, 8 or 9.

According to one embodiment, also a second receiving module 1450 is provided for receiving, instructions, from the primary communication device, instructing the secondary communication device 1400 to initiate the mentioned extended log-in, According to yet another embodiment, a third receiving module 1430 is provided for receiving an invitation to extend a log-in of the primary communication device to the secondary communication device, from the primary communication device, prior to determining that the secondary communication device require log-in of the primary communication device to be extended to the secondary communication device. In the latter case, the extended log-in is initiated from the primary communication device, instead of from the secondary communication device 1400. In resemblance to the primary communication device, also the secondary communication device may be e.g. a smart phone, tablet, or wearable, and, as already mentioned, a secondary communication device may be capable of only operating as a secondary communication device, or may be capable of operating as a primary communication device, instead of as a secondary communication device, once it has been logged-in manually or according to extended log-in, as described herein.

Although FIGS. 12*a*, 12 *b* and 14 disclose communication devices, which comprise software related modules, it is to be understood that alternatively, one or more of these embodiment may instead be implemented in hardware, e.g. by implementing corresponding functionality in one or more ASICs.

The memories mentioned in the embodiments, described with reference to FIG. 11 or 13, can be any combination of RAM and ROM and may also comprise persistent storage, which, for example, can be any single one or combination of magnetic memory, optical memory, solid state memory or even remotely mounted memory. The processor mentioned in the same figures may be configured as any combination of one or more of a suitable central processing unit (CPU), multiprocessor, microcontroller, digital signal processor (DSP) or application specific integrated circuit, capable of executing software instructions stored in a memory.

It is to be understood that both the primary and secondary communication devices typically comprise additional functional modules or units. However, in order to simplify the understanding of the scope of the invention, modules or units not needed for the understanding of the underlying inventive concept have been omitted herein.

The invention claimed is:

1. A method at a primary communication device capable of communicating with a secondary communication device, the method comprising:
   recognizing a successful log-in of the primary communication device; and
   in response to recognizing a successful log-in of the primary communication device:
      receiving, from the secondary communication device, data indicative of a physiological status of the user of the secondary communication device, the received data being data that has been captured by at least one sensor of the secondary communication device, via a body of the user;

capturing data indicative of a physiological status of the user, the captured data being sensed by at least one sensor of the primary communication device via the body of the user;

comparing the acquired data indicative of a physiological status of the user and determining whether there is a match between the compared data; and transmitting, to the secondary communication device, at least one credential required by the secondary communication device for extending the log-in to the secondary communication device if there is a match between the compared data, whereas no credential is transmitted to the secondary device if no match is determined.

2. The method according to claim 1 further comprising:

receiving, from the secondary communication device, a request for extending a log-in of the primary communication device to the secondary communication device; and transmitting, to the secondary communication device, an instruction to initiate said requested extended log-in.

3. The method according to claim 1 further comprising:

transmitting, to the secondary communication device, an invitation to extend a log-in of the primary communication device to the secondary communication device; and receiving, from a primary communication device, a response to the transmitted invitation indicating a demand for extending the log-in from the primary communication device to the secondary communication device.

4. A method at a secondary communication device capable of communicating with a primary communication device for performing a log-in of the secondary communication device, the method comprising:

recognizing that the secondary communication device is one of worn and handheld, by capturing data via at least one sensor, indicating that the secondary communication device is in contact with a body; and in response to recognizing a successful log-in of the primary communication device:

transmitting, to a primary communication device, a request for extending log-in of the primary communication device to the secondary communication device;

capturing data indicative of the physiological status of the user, the captured data being sensed by at least one second type sensor via the body of the user of the secondary communication device;

transmitting the captured data to the primary communication device;

receiving, from the primary communication device, at least one credential, verifying that the data indicative of the physiological status of the user captured by the secondary device match with data indicative of the physiological status of the user captured by the primary communication device; and executing an extended log-in of the secondary communication device based on the at least one received credential.

5. The method according to claim 4, further comprising:

receiving, from the primary communication device, instructions to the secondary communication device instructing the secondary communication device to initiate the extended log-in.

6. The method according to claim 4 further comprising receiving, from the primary communication device, an invitation to extend a log-in of the primary communication device to the secondary communication device.

7. A primary communication device comprising a processor, a communication interface and a memory, comprising computer readable code, which when executed by the processor causes the primary communication device to:

recognize a successful log-in of the primary communication device; and in response to recognizing a successful log-in of the primary communication device:

receive, from the secondary communication device, via the communication interface, data indicative of a physiological status of the user of the secondary communication device and captured by at least one sensor of the secondary communication device, via a body of the user;

capture data indicative of a physiological status of the user, the captured data being sensed by at least one sensor of the primary communication device via the body of said user;

compare the acquired data indicative of a physiological status of the user and determine whether there is a match between the compared data; and transmit, to the secondary communication device, via the communication interface, at least one credential required by the secondary communication device for extending the log-in to the secondary communication device if there is a match between the compared data, whereas no credential is transmitted to the secondary device if no match is determined.

8. The primary communication device according to claim 7, further comprising computer readable code, which when executed by the processor, and prior to determining that the secondary communication device requires the log-in of the primary communication device to be extended to the secondary communication device, causes the primary communication device to:

receive, from the secondary communication device, via the communication interface, a request for extending the log-in of the primary communication device to the secondary communication device; and transmit, to the secondary communication device, via the communication interface, an instruction to initiate the requested extended log-in.

9. The primary communication device according to claim 7, further comprising computer readable code, which when executed by the processor causes the primary communication device to specify in the request, at least one type of sensor which is accessible to the secondary communication device for capturing the data indicative of a physiological status of the user.

10. The primary communication device according to claim 7, further comprising computer readable code, which when executed by the processor, and prior to determine determining that the secondary communication device requires the log-in of the primary communication device to be extended to the secondary communication device, causes the primary communication device to:

transmit, to the secondary communication device, via the communication interface, an invitation to extend log-in of the primary communication device to the secondary communication device; and receive, from a primary communication device, via the communication interface, a response to the transmitted invitation, indicating a demand for extending the log-in from the primary communication device to the secondary communication device.

11. The primary communication device according to claim 10, further comprising computer readable code, which when executed by the processor causes the primary communication device to transmit, via the communication interface, instructions to the secondary device, instructing the secondary device on how to execute the extended log-in.

12. The primary communication device according to claim 7, further comprising computer readable code, which when executed by the processor causes the primary communication device to provide instructions the secondary communication device, instructing the secondary communication device to synchronize capturing of the data indicative of a physiological status of the user by the secondary communication device with the capturing of the data indicative of a physiological status of the user executed by the primary communication device.

13. The primary communication device according to claim 7, further comprising computer readable code, which when executed by the processor causes the primary communication device to provide instructions instructing the secondary device on which of at least one type of sensor to use for capturing the data indicative of a physiological status of the user.

14. A secondary communication device comprising a processor, a communication interface and a memory, comprising computer readable code, which when executed by the processor causes the secondary communication device to:
recognize that the secondary communication device is one of worn and handheld, by capturing data via at least one sensor indicating that the secondary communication device is in contact with a body; and
in response to recognizing a successful log-in of the primary communication device:
transmit, to a primary communication device via the communication interface, a request for extending log-in of the primary communication device to the secondary communication device;
capture data indicative of the physiological status of the user, the captured data being sensed by at least one second type sensor via the body of the user of the secondary communication device;
transmit the captured data to the primary communication device, via the communication interface;
receive, from the primary communication device via the communication interface, at least one credential verifying that the data indicative of the physiological status of the user captured by the secondary device match with data indicative of the physiological status of the user captured by the primary communication device; and
execute an extended log-in of the secondary communication device based on the at least one received credential.

15. The secondary communication device according to claim 14, further comprising computer readable code, which when executed by the processor causes the secondary communication device to receive from the primary communication device, via the communication interface, instructions to the secondary communication device, instructing the secondary communication device to initiate the extended log-in when the request is a request which has been transmitted to the primary communication in response to determining, by the secondary communication device, that extended log-in is required by the secondary communication device.

16. The secondary communication device according to claim 15, further comprising computer readable code, which when executed by the processor and prior to determining that the secondary communication device requires the log-in of the primary communication device to be extended to the secondary communication device, causes the secondary communication device to receive, from the primary communication device via communication interface, an invitation to extend a log-in of the primary communication device to the secondary communication device.

17. The secondary communication device according to claim 16, further comprising computer readable code, which when executed by the processor causes the secondary communication device to transmit the request as a response to the invitation.

18. The secondary communication device according to claim 16, further comprising computer readable code, which when executed by the processor causes the secondary communication device to receive, from the primary communication device, the instructions together with said invitation.

19. The secondary communication device according to claim 14, further comprising computer readable code, which when executed by the processor causes the secondary communication device to provide said instructions with instructions, instructing the secondary communication device on how to execute the extended log-in.

20. The secondary communication device according to claim 14, further comprising computer readable code, which when executed by the processor causes the secondary communication device to:
recognize that the secondary communication device is no longer one of worn and handheld, by capturing data via at least one sensor indicating that the secondary communication device is no longer in contact with any human body; and
initiate log-out of the secondary communication device.

* * * * *

UNITED STATES PATENT AND TRADEMARK OFFICE
CERTIFICATE OF CORRECTION

| | |
|---|---|
| PATENT NO. | : 11,159,509 B2 |
| APPLICATION NO. | : 16/063945 |
| DATED | : October 26, 2021 |
| INVENTOR(S) | : Araújo et al. |

It is certified that error appears in the above-identified patent and that said Letters Patent is hereby corrected as shown below:

In the Specification

In Column 5, Line 29, delete "hold" and insert -- held --, therefor.

In Column 11, Line 43, delete "users hart" and insert -- user's heart --, therefor.

In Column 12, Line 29, delete "in by" and insert -- by --, therefor.

In Column 15, Line 2, delete "a on which" and insert -- which --, therefor.

In Column 19, Lines 32-33, delete "computer program 1130" and insert -- computer program 1140 --, therefor.

Signed and Sealed this
Seventeenth Day of May, 2022

Katherine Kelly Vidal
*Director of the United States Patent and Trademark Office*